(12) United States Patent
Gutierrez et al.

(10) Patent No.: US 10,188,962 B2
(45) Date of Patent: *Jan. 29, 2019

(54) GRID-BASED VIRTUAL REALITY ATTRACTION SYSTEM

(71) Applicant: UNCHARTEDVR, INC., San Rafael, CA (US)

(72) Inventors: Kalon Ross Gutierrez, San Francisco, CA (US); John Duncan, San Anselmo, CA (US); Douglas Griffin, Mill Valley, CA (US); Richard Schulze, Sausalito, CA (US)

(73) Assignee: Unchartedvr Inc., San Rafael, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/828,257

(22) Filed: Nov. 30, 2017

(65) Prior Publication Data
US 2018/0140963 A1 May 24, 2018

Related U.S. Application Data

(63) Continuation of application No. 15/783,664, filed on Oct. 13, 2017, now Pat. No. 10,105,619.

(60) Provisional application No. 62/571,638, filed on Oct. 12, 2017, provisional application No. 62/424,587, (Continued)

(51) Int. Cl.
| | | |
|---|---|---|
| A63F 13/57 | (2014.01) | |
| A63F 13/213 | (2014.01) | |
| A63J 1/02 | (2006.01) | |
| G06T 19/00 | (2011.01) | |
| G06F 3/01 | (2006.01) | |
| A63F 13/216 | (2014.01) | |
| A63F 9/02 | (2006.01) | |
| A63G 31/00 | (2006.01) | |
| A63G 31/16 | (2006.01) | |

(Continued)

(52) U.S. Cl.
CPC ............ *A63J 1/02* (2013.01); *A63F 9/0278* (2013.01); *A63F 13/216* (2014.09); *A63G 31/00* (2013.01); *A63G 31/16* (2013.01); *A63G 33/00* (2013.01); *A63J 5/02* (2013.01); *G06F 3/012* (2013.01); *G06T 19/003* (2013.01); *G06T 19/006* (2013.01)

(58) Field of Classification Search
None
See application file for complete search history.

(56) References Cited

U.S. PATENT DOCUMENTS

| | | |
|---|---|---|
| 7,693,702 B1 | 4/2010 | Kerner et al. |
| 8,638,989 B2 | 1/2014 | Holz |
| 9,215,293 B2 | 12/2015 | Miller |

(Continued)

*Primary Examiner* — Martin Mushambo
(74) *Attorney, Agent, or Firm* — Richard K. Huffman; Eric W. Cernyar; James W. Huffman

(57) ABSTRACT

A comprehensive solution is provided to transforming locations and retail spaces into high-traffic VR attractions that provide a VR experience blended with a real-world tactile experience. A modular stage and kit of stage accessories suitable for a wide variety of commercial venues contains all of the necessary equipment, infrastructure, technology and content to assemble and operate a tactile, onsite VR attraction. Utilizing a modular set of set design and physical props, the physical structure and layout of the installations are designed to be easily rearranged and adapted to new VR content, without requiring extensive construction or specialized expertise.

20 Claims, 22 Drawing Sheets

Related U.S. Application Data filed on Nov. 21, 2016, provisional application No. 62/408,667, filed on Oct. 14, 2016.

(51) Int. Cl.
*A63G 33/00* (2006.01)
*A63J 5/02* (2006.01)

(56) References Cited

U.S. PATENT DOCUMENTS

| | | |
|---|---|---|
| 9,363,569 B1 * | 6/2016 | van Hoff ............ G06Q 30/0263 |
| 9,669,321 B2 | 6/2017 | Reveley |
| 2006/0150530 A1 | 7/2006 | Davey |
| 2009/0325699 A1 | 12/2009 | Delgiannidis |
| 2016/0001175 A1 | 1/2016 | Aronzon et al. |
| 2016/0004298 A1 * | 1/2016 | Mazed ................... G06F 3/011 |
| | | 345/633 |
| 2016/0225188 A1 | 8/2016 | Ruddell et al. |
| 2016/0275722 A1 * | 9/2016 | Bretschneider ....... G06T 19/006 |
| 2017/0124767 A1 | 5/2017 | Foust |
| 2017/0261745 A1 | 9/2017 | Fitzgerald et al. |
| 2017/0285733 A1 | 10/2017 | Bretschneider et al. |

* cited by examiner

GRID-BASED VIRTUAL REALITY ATTRACTION SYSTEM

CROSS-REFERENCE TO RELATED APPLICATIONS

This application is a continuation of the following U.S. patent application, which is herein incorporated by reference for all intents and purposes.

| SER. NO. | FILING DATE | TITLE |
| --- | --- | --- |
| 15/783,664 | Oct. 13, 2017 | MODULAR SOLUTION FOR DELIVERING A VIRTUAL REALITY ATTRACTION |

This application is related to the following co-pending U.S. patent applications, each of which has a common assignee and common inventors.

| SER. NO. | FILING DATE | TITLE |
| --- | --- | --- |
| 15/828,198 | Nov. 30, 2017 | METHOD FOR GRID-BASED VIRTUAL REALITY ATTRACTION |
| 15/828,276 | Nov. 30, 2017 | SMART PROPS FOR GRID-BASED VIRTUAL REALITY ATTRACTION |
| 15/828,294 | Nov. 30, 2017 | MULTIPLE PARTICIPANT VIRTUAL REALITY ATTRACTION |
| 15/828,307 | Nov. 30, 2017 | GRID-BASED VIRTUAL REALITY SYSTEM FOR COMMUNICATION WITH EXTERNAL AUDIENCE |

BACKGROUND OF THE INVENTION

Field of the Invention

This invention relates in general to the field of virtual reality attractions, and more particularly to virtual reality attractions that blend physical elements with VR representations.

BRIEF DESCRIPTION OF THE DRAWINGS

These and other objects, features, and advantages of the present invention will become better understood with regard to the following description, and accompanying drawings where.

DETAILED DESCRIPTION

Figure 1:
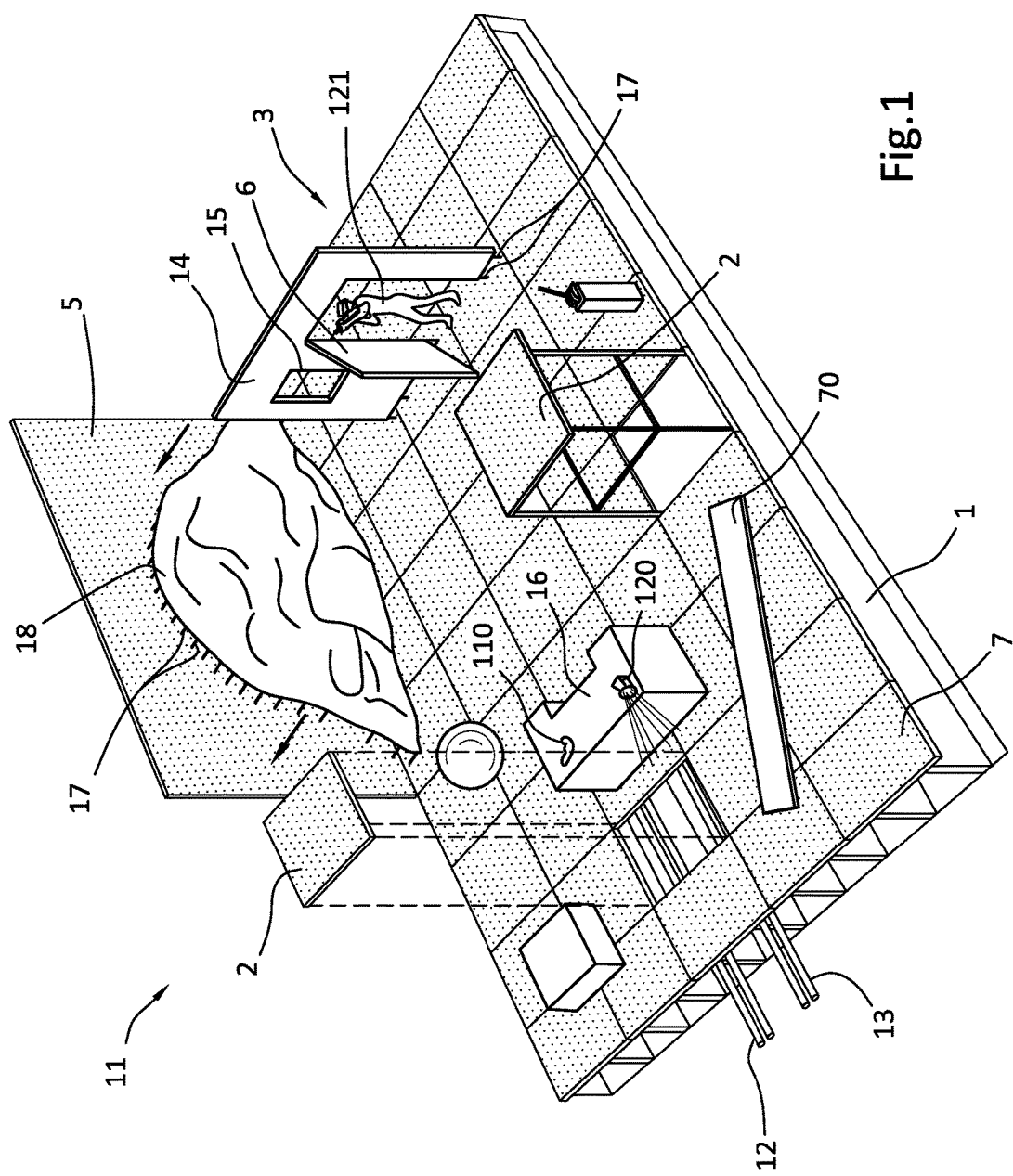
FIG. 1 illustrates one embodiment of a modular stage with a first arrangement of stage accessories to augment the illusion of a first VR experience.

Exemplary and illustrative embodiments of the invention are described below. In the interest of clarity, not all features of an actual implementation are described in this specification, for those skilled in the art will appreciate that in the development of any such actual embodiment, numerous implementation specific decisions are made to achieve specific goals, such as compliance with system-related and business-related constraints, which vary from one implementation to another. Furthermore, it will be appreciated that such a development effort might be complex and time-consuming, but would nevertheless be a routine undertaking for those of ordinary skill in the art having the benefit of this disclosure. Various modifications to the preferred embodiment will be apparent to those skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The present invention will now be described with reference to the attached figures. Various structures, systems, and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase (i.e., a definition that is different from the ordinary and customary meaning as understood by those skilled in the art) is intended to be implied by consistent usage of the term or phrase herein. To the extent that a term or phrase is intended to have a special meaning (i.e., a meaning other than that understood by skilled artisans) such a special definition will be expressly set forth in the specification in a definitional manner that directly and unequivocally provides the special definition for the term or phrase.

FIG. 1 illustrates one embodiment of a modular stage 1 with a first grid aligned arrangement 11 of stage accessories 14, 16, 18, 70, 110, 120 to augment the illusion of a first VR experience/representation. The stage accessories 14, 16, 18, 70, 110, 120 are provided as part of a VR stage kit 11. The stage accessories 14, 16, 18, 70, 110, 120 are assembled to the stage 1 according a plurality of stage plans or arrangements that correspond to a plurality of VR representations (aka "VR worlds") provided in a VR attraction. The stage accessories 14, 16, 18, 70, 110, 120 include set pieces and props. For example, FIG. 1 illustrates a façade 14 with a window 15 and door 6, a rock 18 attached to a perimeter wall 5, a flashlight prop 120 and a firearm prop 110 resting on a desk 16, and a plank 70 on resting on a floor of a modular stage platform 3. The accessories 14, 16, 18, 70, 110, 120 give virtual reality participants sensory feedback that augments a virtual reality representation. Some of the accessories 14, 16, 18, 70, 110, 120 may comprise fittings 17 (such as pegs) to mount them to the modular stage platform 3.

A modular stage 1 comprises a plurality of separable modular stage sections 2 designed to fit and cooperate with each other for ease of assembly to form the stage 1. The modular stage 1 and its kit 11 of stage accessories 14, 16, 18, 70, 110, 120 are configurable to fill a discrete set of spatial areas—for example, 10 meters by 20 meters and 15 meters by 15 meters—that might be found in a mall, theater, or other retail space. Different spatial representations of a VR world are created to fit one or more of these areas and correspond to one or more stage plans or arrangements of accessories 14, 16, 18, 70, 110, 120 on the stage 1.

In one embodiment, the modular stage 1 comprises a commercially available stage kit (not to be confused with the accessory kit 11 described herein). Discretely positioned (and preferably regularly spaced) accessory mounts 7 are either provided with, or incorporated into, the stage 1. In one embodiment, the stage 1 is elevated above the ground, enabling signal lines 12 and power lines 13 to pass underneath the platform 3 and through openings in the platform 3 (e.g., the peg holes 7) to service the accessories 14, 16, 18, 70, 110, 120 mounted on the stage 1.

Figure 3:
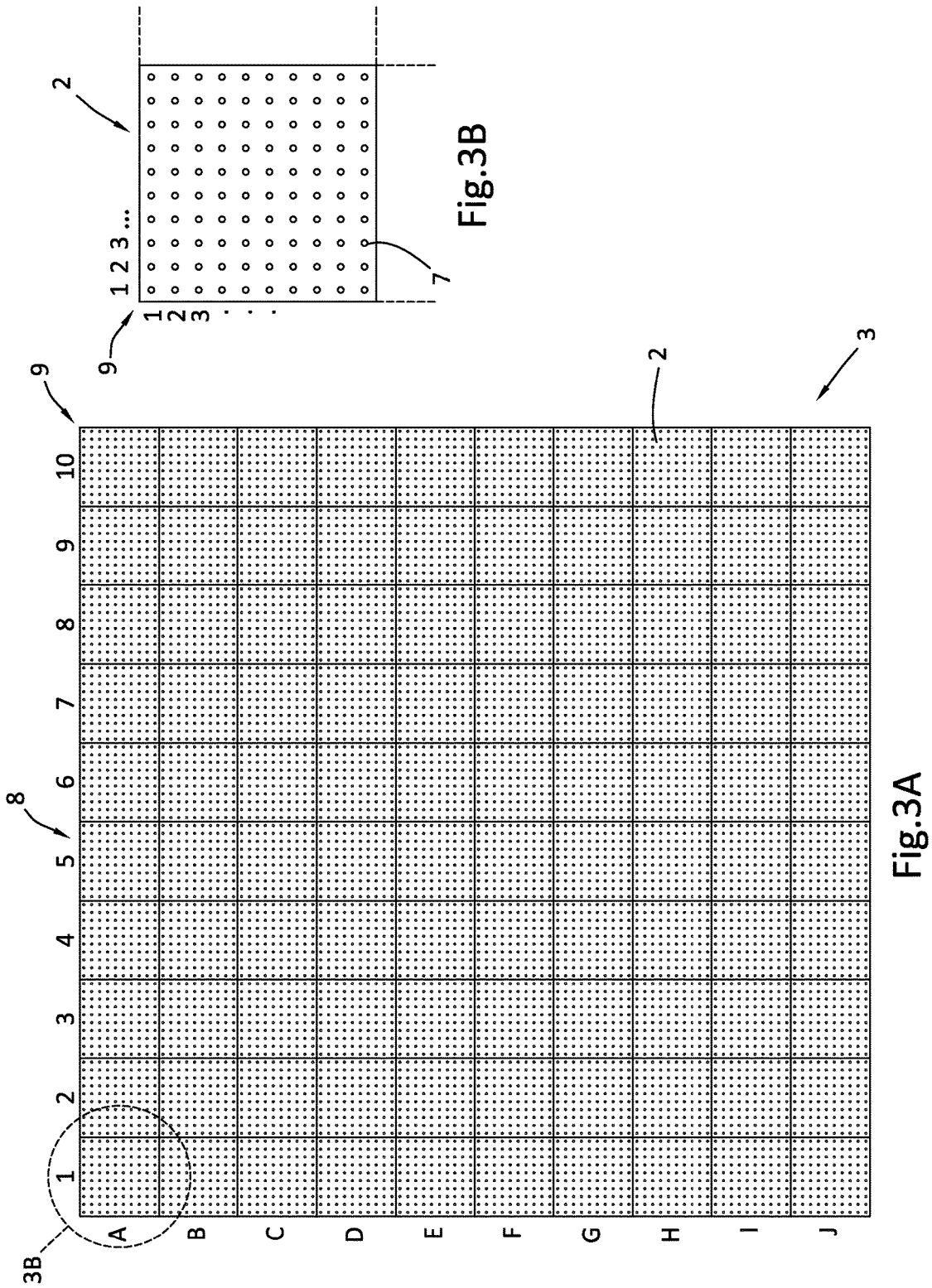
FIG. 3A illustrates the modular stage of FIG. 1 illustrating a labeled grid of separable modular stage sections, each having a plurality of peg holes for fixing the stage accessories to the modular stage.
FIG. 3B is an enlarged view of a separable modular stage section, showing a labeled secondary grid of peg holes in the modular stage section.

FIG. 3A illustrates a modular stage platform 3 made up of separable squares or platform sections 2. For example, each square 2 may be 1 m×1 m. FIG. 3B illustrates each square 2 as providing multiple aligned rows of accessory mounts 7 in the form of holes that are spaced 1 decimeter (for example) apart from each nearest accessory mount 7. The squares 2 are adapted to be connected to each other to create platforms 3 of different rectilinear dimensions. This enables the modular stage 1 to fit a wide range of conventional leasable commercial spaces.

The accessory mounts 7 are placed at preselected coordinates in a grid-like fashion in order to provide discrete places, readily and accurately represented in a VR world, for the mounting of the stage accessories 14, 16, 18, 70, 110, 120. In one practical embodiment, the accessory mounts 7 are peg holes that are regularly spaced and configured for receiving accessories that have cooperating pegs. In this application, the term "peg" is used in a broad sense to encompass large structures as well as small structures. The peg holes 7 may be round, square, dimensioned to receive a dimensional board, or some other shape. The peg holes 7 are defined by a surrounding structure that, in conjunction with cooperating fittings or mounts 17 (e.g., pegs), provide sufficient strength to fix and stabilize any mounted accessory 14, 16, 18, 70, 110, 120. In an alternative embodiment, the stage platform 3 is modified to incorporate pegs 17 for receiving accessories 14, 16, 18, 70, 110, 120 with cooperating holes 7.

Any suitable substitute for a peg-and-hole system would also fall within the scope of the present invention, including mounts in the form of seats, sockets, interconnectors, fasteners, couplers, couplings, clamps, hand-operated quick-release clasps, ties, pins, snaps, links, and the like. The scope of the invention also includes any arrangement of female and male parts that attach one object to another, provided that they facilitate quick assembly and disassembly.

Collectively, the peg holes or other accessory mounts 7 of the modular stage platform 3 are aligned within rectilinear rows and columns, forming a grid or regular pattern 8. In one embodiment, the stage sides have a primary set of alphanumeric markings 9, respectively, to identify each square 2 in the modular stage. In the 1 meter by 1 meter square embodiment, this grid density provides a 1 meter by 1 meter level of resolution. Each square or alternatively dimensioned platform section 2 may also be labeled with its own secondary set of alphanumeric markings 9, to identify each accessory mount 7 in the square or section 2. In the 100-holes per square embodiment, this grid density provides a 1-decimeter by 1-decimeter level of resolution. The invention is, of course, not limited to these square dimensions or grid densities.

The assembly of the accessories 14, 16, 18, 70, 110, 120 to the modular stage platform 3 makes use of the positioning grid 8. For example, as noted above, many of the accessories 14, 16, 18, 70, 110, 120 are arranged with fittings 17 (such as pegs) to mount them to the modular stage platform 3 at particular stage platform coordinates. The accessory mounts 7 cooperate with the fittings 17 to secure the accessories 14, 16, 18, 70, 110, 120 to the platform 3. This aids in fast and accurate alignment with objects in virtual reality.

Figure 4:
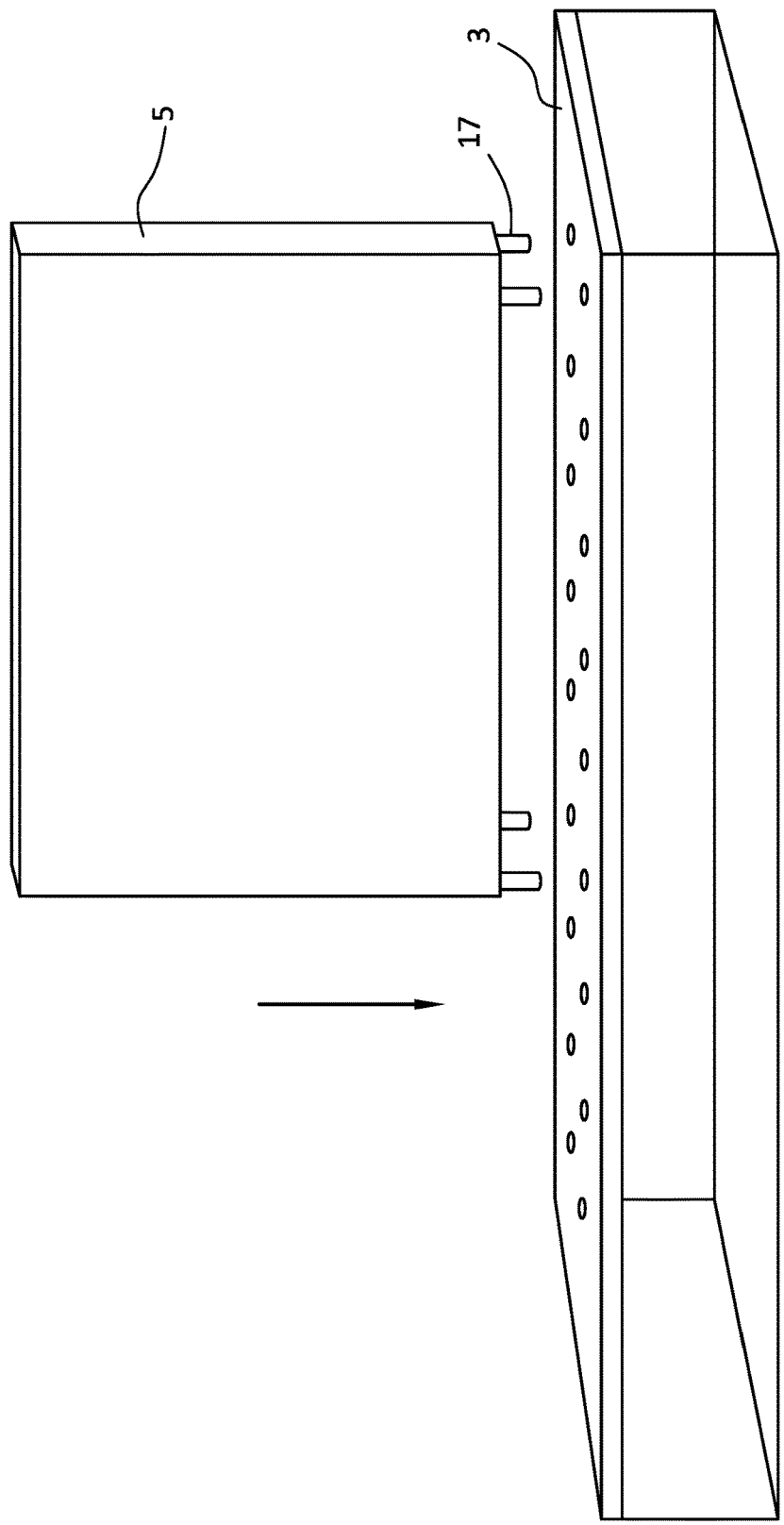
FIG. 4 is a perspective view of a wall equipped with pegs positioned over holes in a portion of the modular stage.

FIG. 4 illustrates this ease of assembly and disassembly by showing a wall section 5 equipped with fittings 17 in the form of pegs positioned over peg holes 7 in a portion of the modular stage platform 3. Assembling the wall section 5 may be as simple as identifying the correct holes on the grid 8 using the alphanumeric markings 9 labeling the grid 8, and inserting the pegs into the holes 7. Disassembling the wall section 5 may be as simple as lifting it from the stage 3. Quick-release clamps or connectors (e.g., clamps or connectors that do not require tools to operate) may optionally be employed, because they would only modestly increase the amount of time needed to assemble and disassemble the accessories 14, 16, 18, 70, 110, 120.

Parts may be added to or subtracted from the kit 11 to create new configurations. In one embodiment, the modular stage 1 includes perimeter walls 5 that are also covered in a labeled grid pattern 8, facilitating fastening of objects to the walls 5 in precise, discrete, exact, and vertically-aligned locations. A primary modular stage accessory 5, such as an interior wall, may include its own labeled grid and pattern of accessory mounts (not shown) so that one or more secondary modular stage accessories 14, 16, 18, 70, 110, 120 can be accurately mounted to the primary stage accessory 5.

The grid-based approach described above is preferable to several alternative approaches to aligning a virtual world with a physical construction. One common alternative approach is to create a permanent "one-up" VR attraction that has not been designed in a modular fashion. It is not practical to update such attractions, limiting their ability to bring in and appeal to repeat customers. Another approach would require that video sensors and/or other sensors be used to determine the location and orientation of each fixed, stationary modular stage accessory 14, 16, 18. This approach in practice would provide a less accurate and/or reliable means of aligning the virtual and physical worlds than this invention's approach, in which the objects of the VR representation and the physical world are positioned at predetermined coordinates or grid points that select prepositioned accessory mounts 7. Another alternative would involve arranging accessories 14, 16, 18, 70, 110, 120 on to the stage platform 3 at specified coordinates without the benefit of a grid 8 or a patterned arrangement of peg holes or the like. A disadvantage of this approach is that it takes longer to assemble the stage, and with greater chance of error. Another disadvantage of this approach is that stage assemblers cannot assemble a stage as precisely and quickly, this way, as they would with the grid-based approach. The result is that the physical and virtual worlds may not align as precisely as they would with the grid-based approach.

As noted above, in one embodiment, the stage 1 is elevated above the ground, enabling signal lines 12 and power lines 13 to pass underneath the platform 3 and through openings in the platform 3 (e.g., the peg holes 7) to service the accessories 14, 16, 18, 70, 110, 120 mounted on the stage 1.

Figure 2:
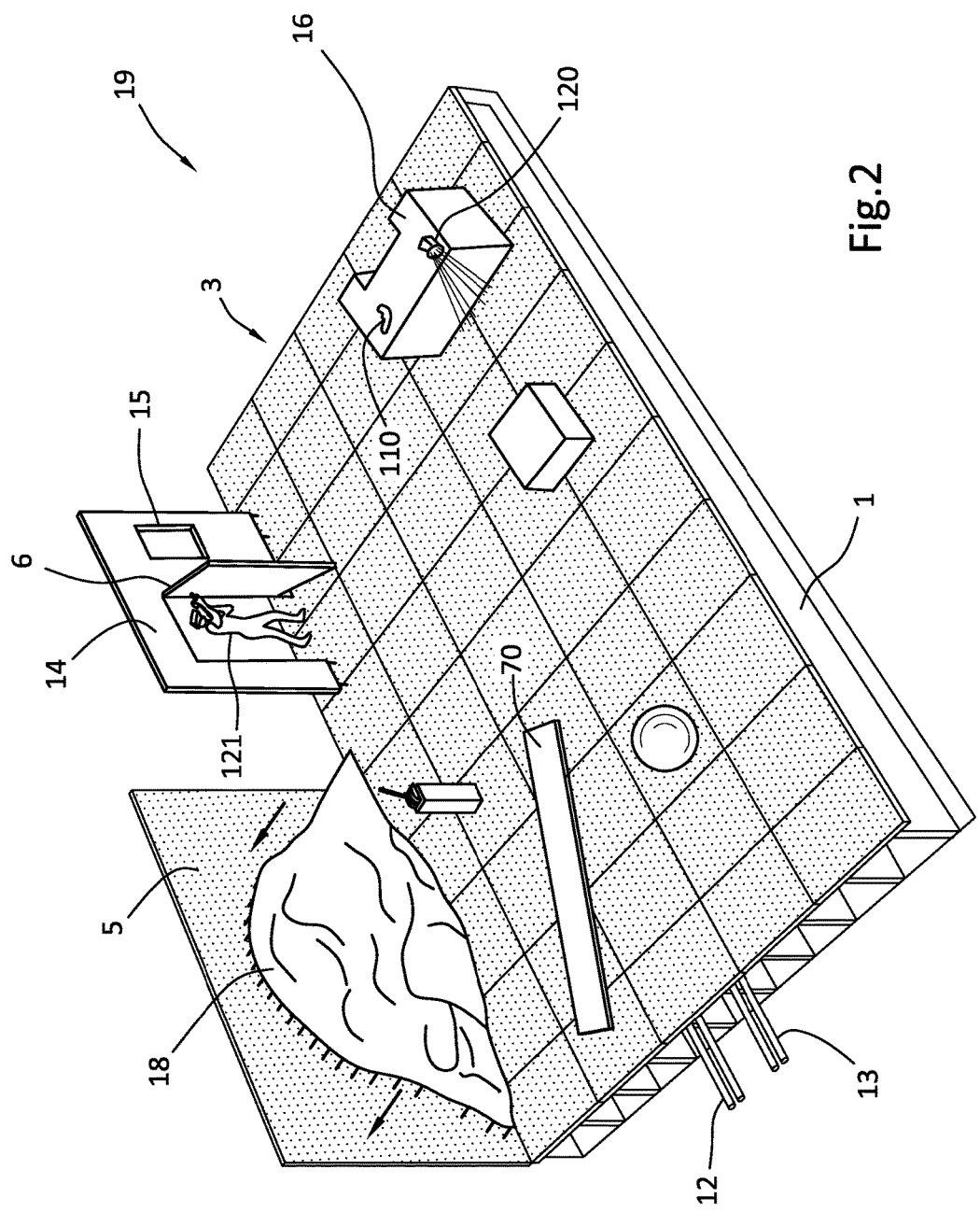
FIG. 2 illustrates the modular stage of FIG. 1 with a second arrangement of stage accessories to augment the illusion of a second VR experience.

FIG. 2 illustrates the modular stage 1 of FIG. 1 with a second stage plan or arrangement 19 of stage accessories 14, 16, 18, 70, 110, 120 to augment the illusion of a second VR representation. FIGS. 1 and 2 illustrate the speed and convenience with which accessories 14, 16, 18, 70, 110, 120 can be accurately re-arranged on the stage 1 to correspond to different VR representations, with an ease that resembles rearranging Lego® blocks or placing one's ships at the start of a new Battleship® game. Advantageously, this makes it practical for proprietors to engage local customers with new experiences, keeping them coming back again and again.

Figure 5:
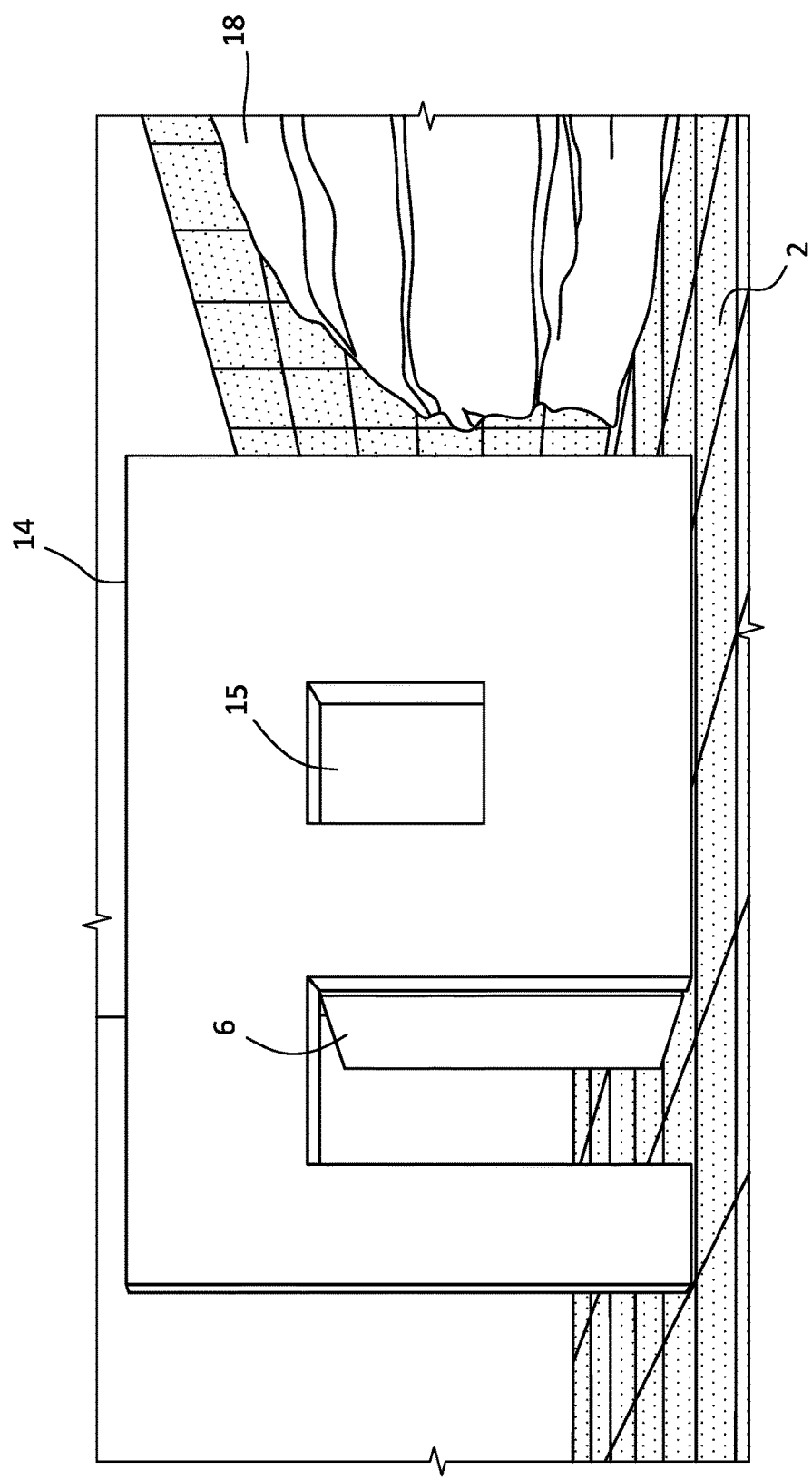
FIG. 5 illustrates a building façade accessory mounted on a modular stage.
Figure 6:
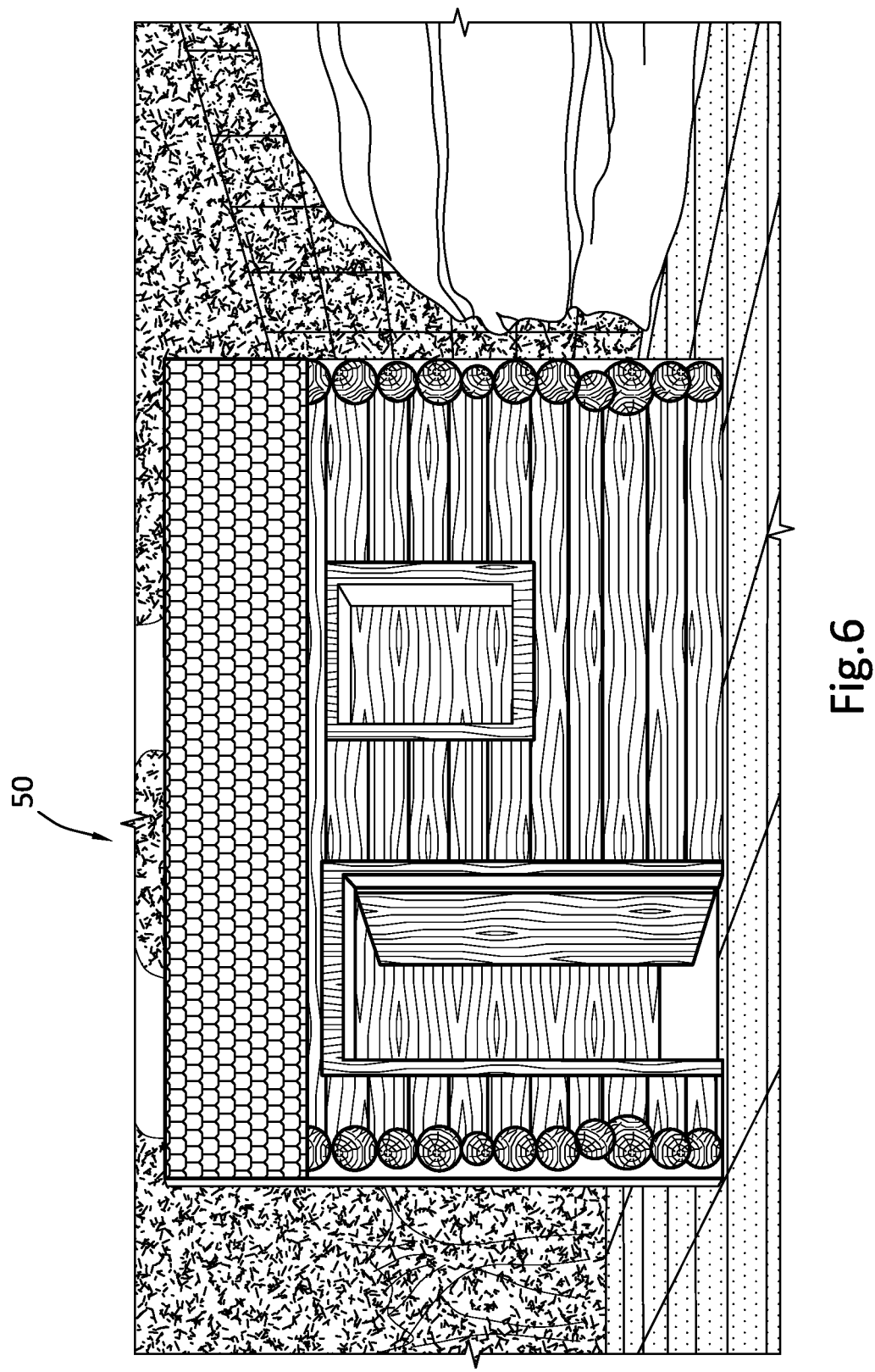
FIG. 6 illustrates a VR representation of the building façade, embellished with an appearance of log siding and a tiled roof in a wooded surrounding.

FIG. 5 illustrates a building façade 14 mounted on a modular stage. The building façade 14 comprises a door 6 and window 15 and has simple, flat dimensions. A 3D polystyrene rendering of a rock 18 has the contour of a large rock or boulder and is coated with material like sand and simulated moss to give it a rock-like tactile sensation. FIG. 6 illustrates a VR representation 50 of the building façade 14, embellished with an appearance of log siding and a tiled roof in a wooded surrounding.

Figure 7:
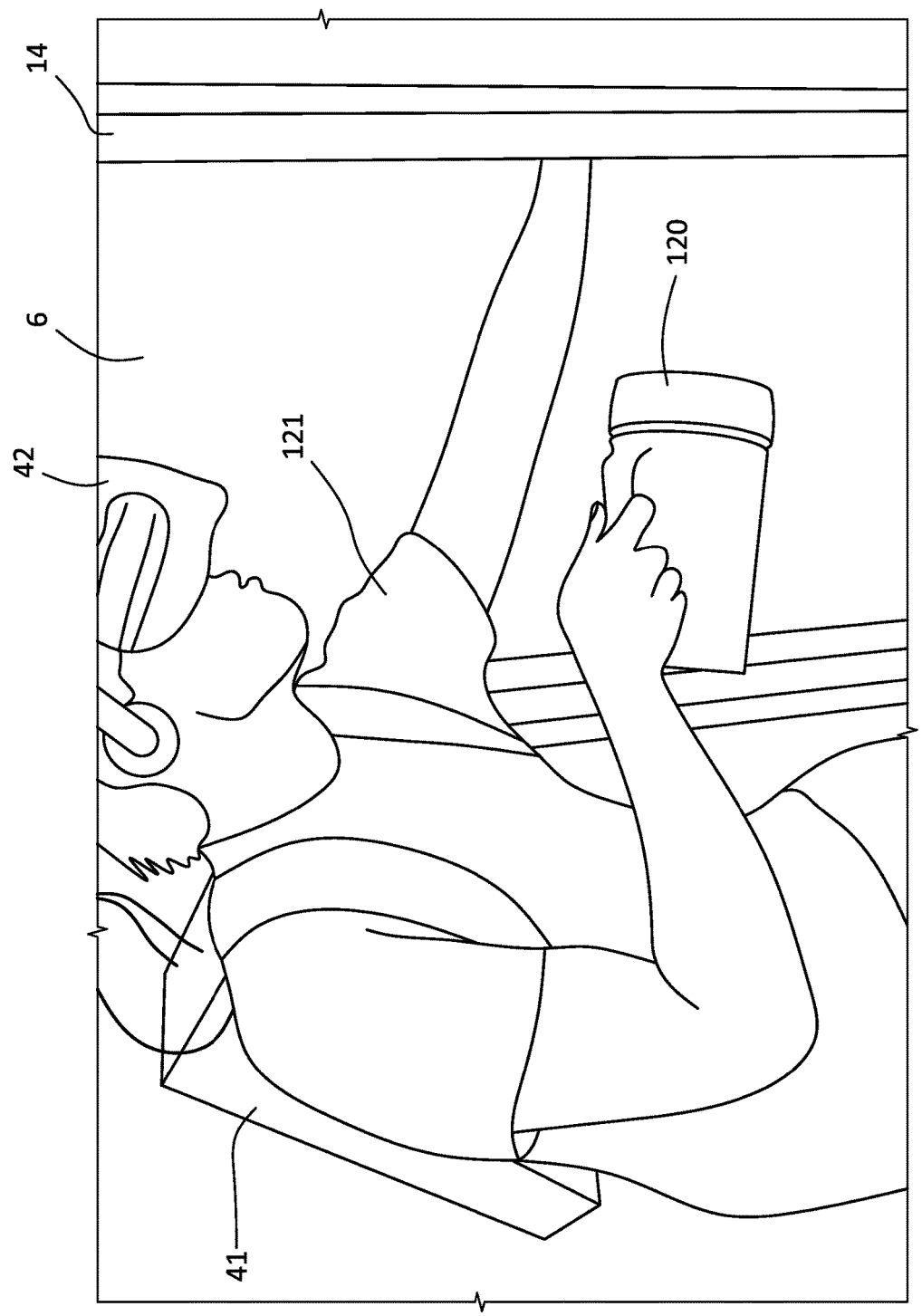
FIG. 7 illustrates a VR participant holding a flashlight prop while pushing open a door of the building façade.

FIG. 7 illustrates a VR participant 121 carrying a backpack 41 and wearing a VR headset 42. The backpack 41 carries a computer (not shown) running a VR engine. The VR participant 121 is holding a flashlight prop 120 while pushing open the door 6 of the building façade 14. The flashlight prop 120 comprises a conventional flashlight case. To create the flashlight prop 120, any regular-sized battery, and optionally also the light bulb and lens, in the conventional flashlight case are removed. These items are replaced with a smaller power source, orientation sensors and/or a self-tracking beacon so that a motion tracking system (not shown) can determine the location and orientation of the flashlight prop 120.

Figure 8:
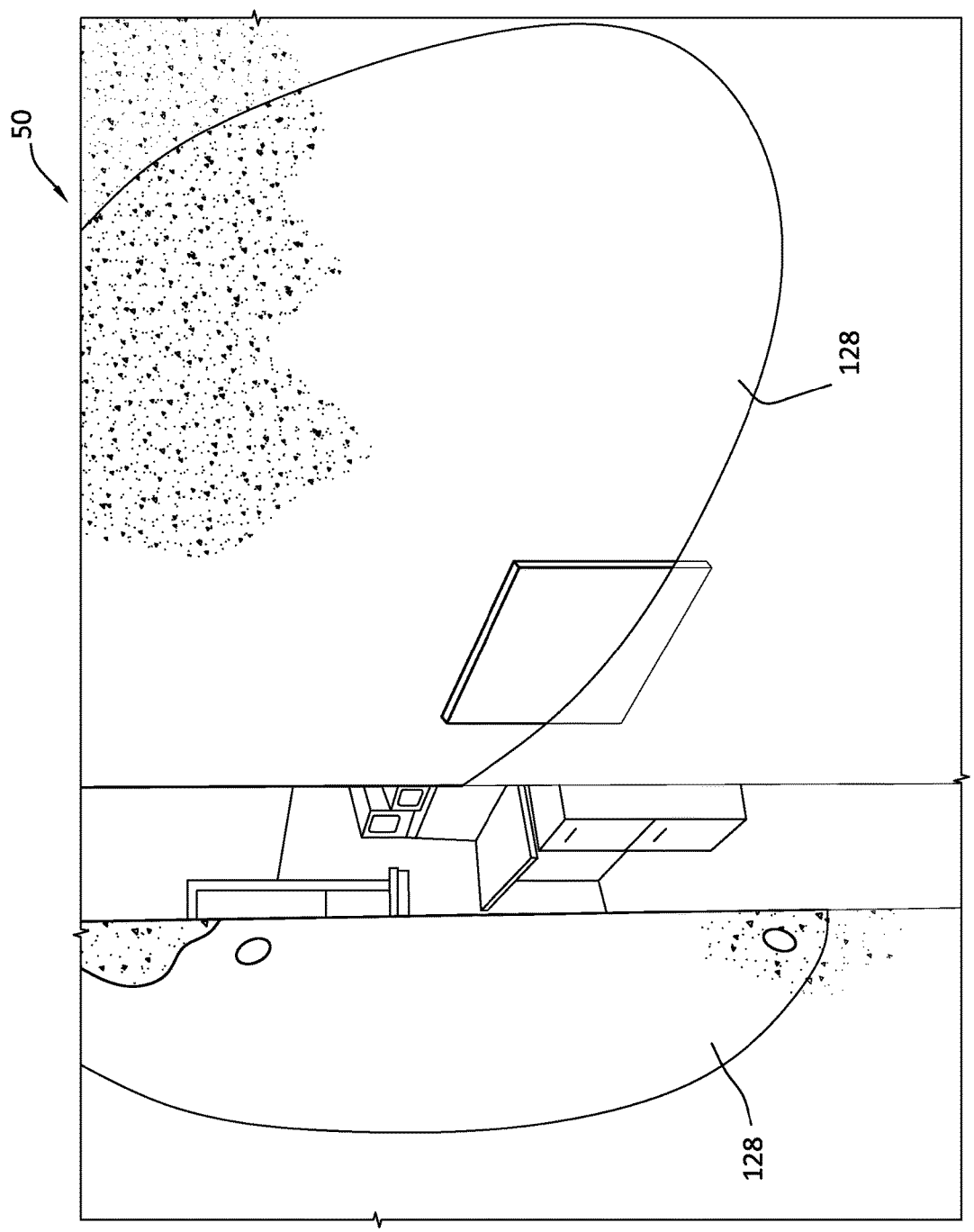
FIG. 8 illustrates a VR representation of an aged industrial doorway, with a flashlight-illuminated area that corresponds to the direction in which the flashlight prop is pointing.

As shown in FIG. 8, a VR engine running on the computer in the backpack 41 receives the ID, position, and location coordinates of the flashlight prop 120 and renders a VR representation 50 of a flashlight-illuminated portion of the façade 14 and door 6, and a portion of an office beyond the façade 14. In this VR representation 50, which contrasts with the woodsy VR representation 50 of FIG. 6, the doorway is embellished to look aged, with rust spots and paint chips. Elliptical areas 128 are rendered illuminated and the areas around the elliptical areas 128 are rendered dark, corresponding to the direction in which the flashlight prop 120 is pointing. This reinforces the illusion that the sensory information received from the VR headset 42 is real.

Figure 9:
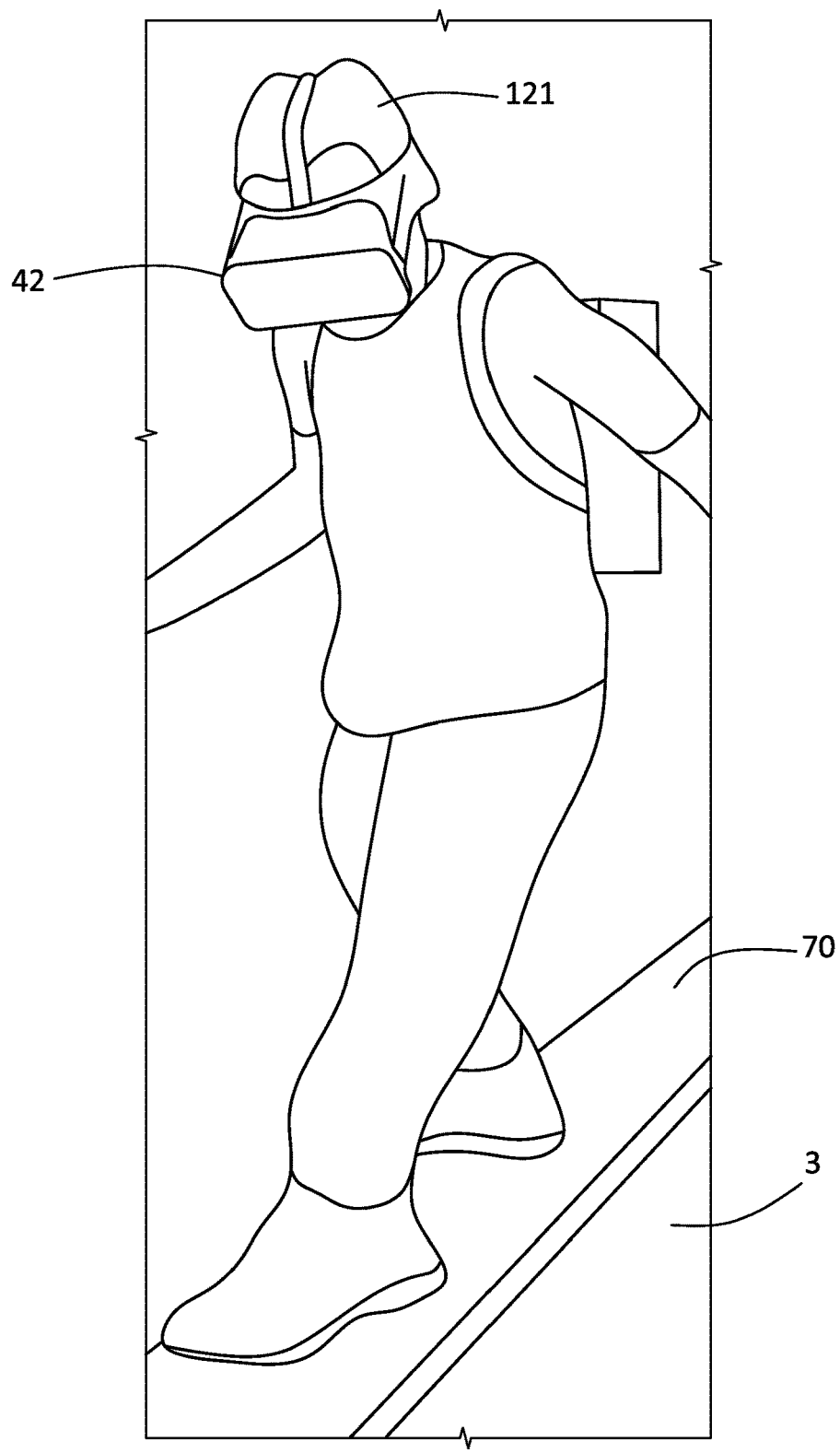
FIG. 9 illustrates a VR participant walking over a wooden plank prop positioned on a modular stage platform.
Figure 10:
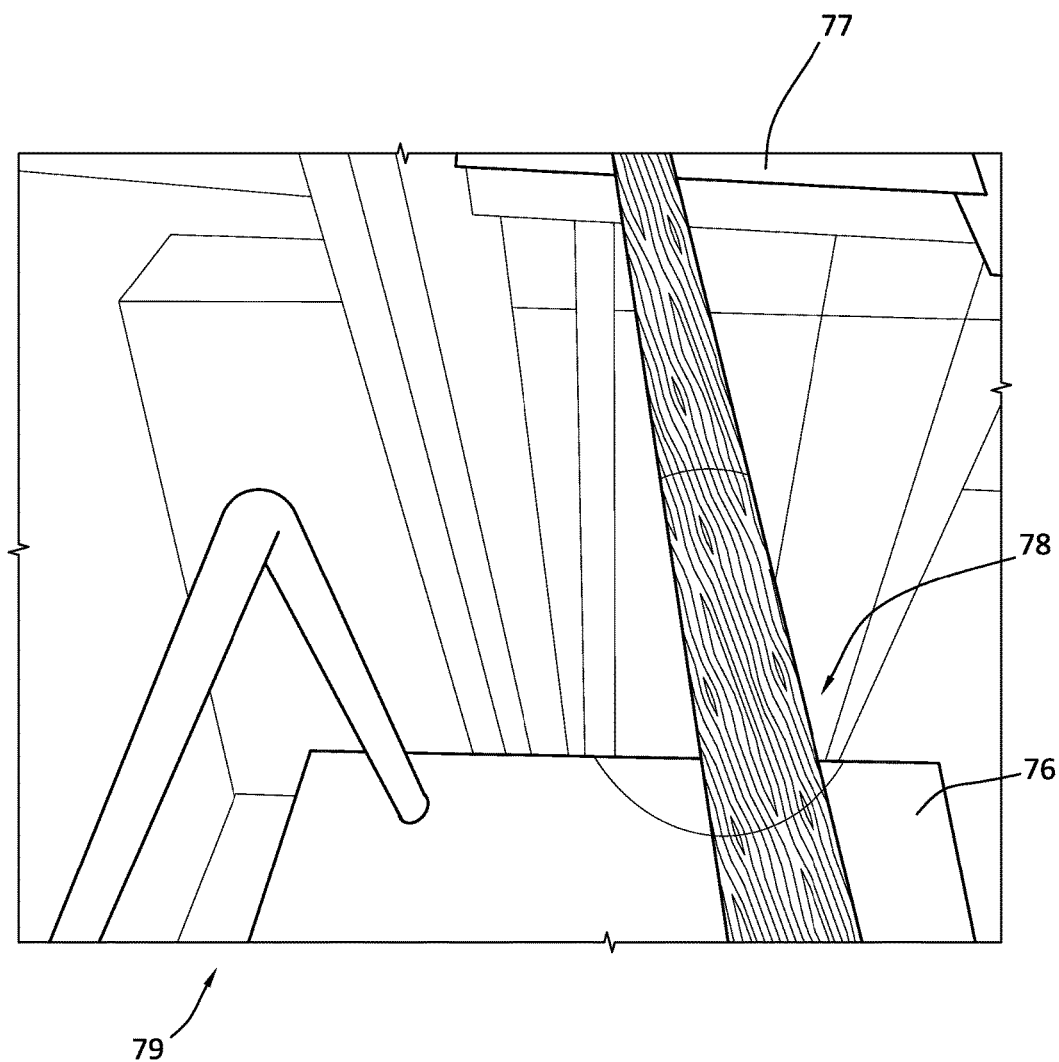
FIG. 10 illustrates a corresponding VR representation of the wooden plank positioned over a deep gap separating two buildings.

FIG. 9 illustrates the VR participant 121 walking over the wooden plank prop 70 that is shown in FIG. 1 positioned on a modular stage platform 3. The wooden plank prop 70 has a natural warp that causes it to wobble when crossed. The VR participant 121 walks very cautiously over the plank 70, even though the plank 70 is safely resting on the platform 3, and the VR participant 121 has a mere 1½ inches to fall should he lose his footing. The VR participant's fear is fueled by the VR representation 50 depicted through the participant's headset 42. As shown in FIG. 10, the VR participant 121 sees a virtual representation 79 of the plank 70 precariously spanning a deep gap 78 separating two buildings 76 and 77. And when the physical plank 70 wobbles, a motion tracking system (not shown) or accelerometer feedback wirelessly provided from the plank 70 detects the wobble. Using this data, the VR engine simulates the wobble and the disorienting effect of the wobble on in the VR representation 79 of the plank 70. Sound effects, such as squeaks, wood cracking and splintering further add to the illusion of danger.

Figure 11:
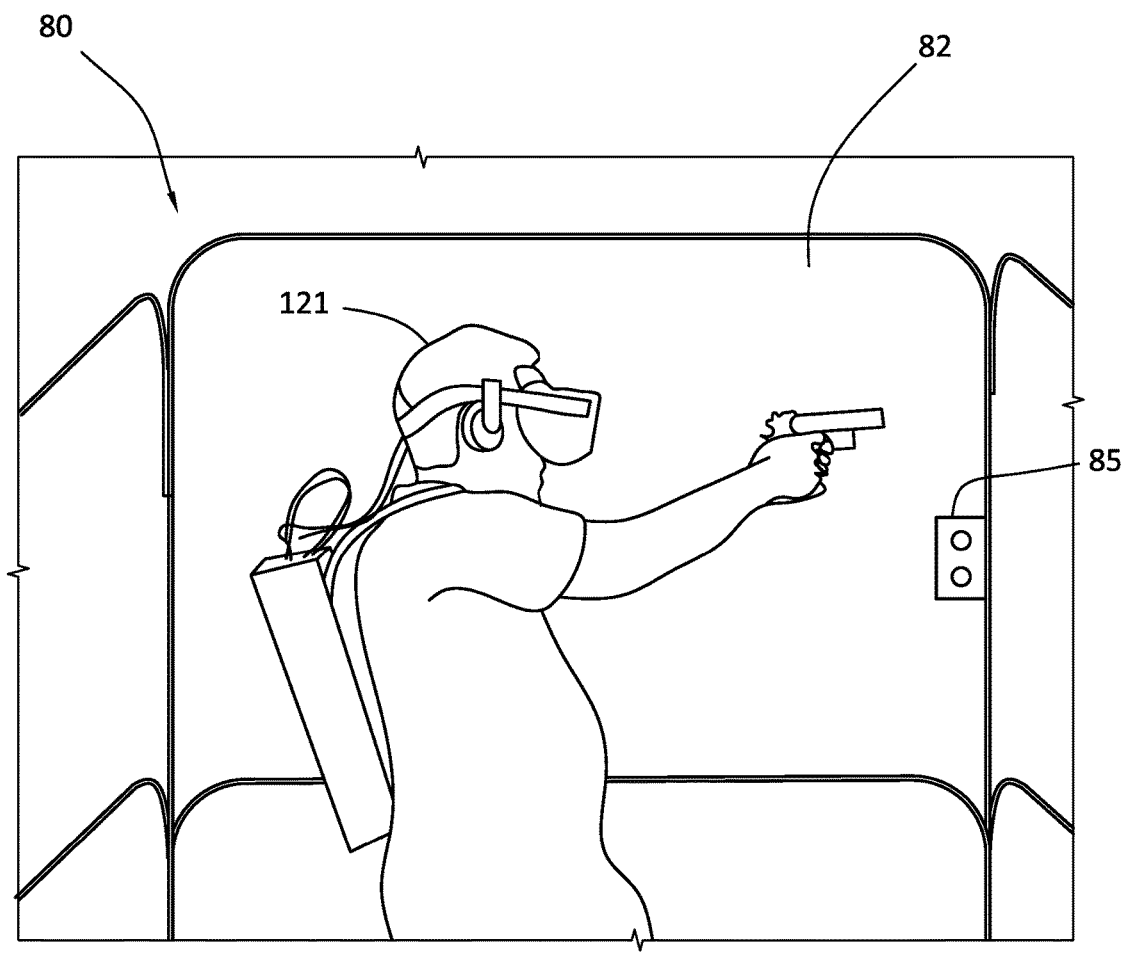
FIG. 11 illustrates an elevator simulator on the modular stage.
Figure 12:
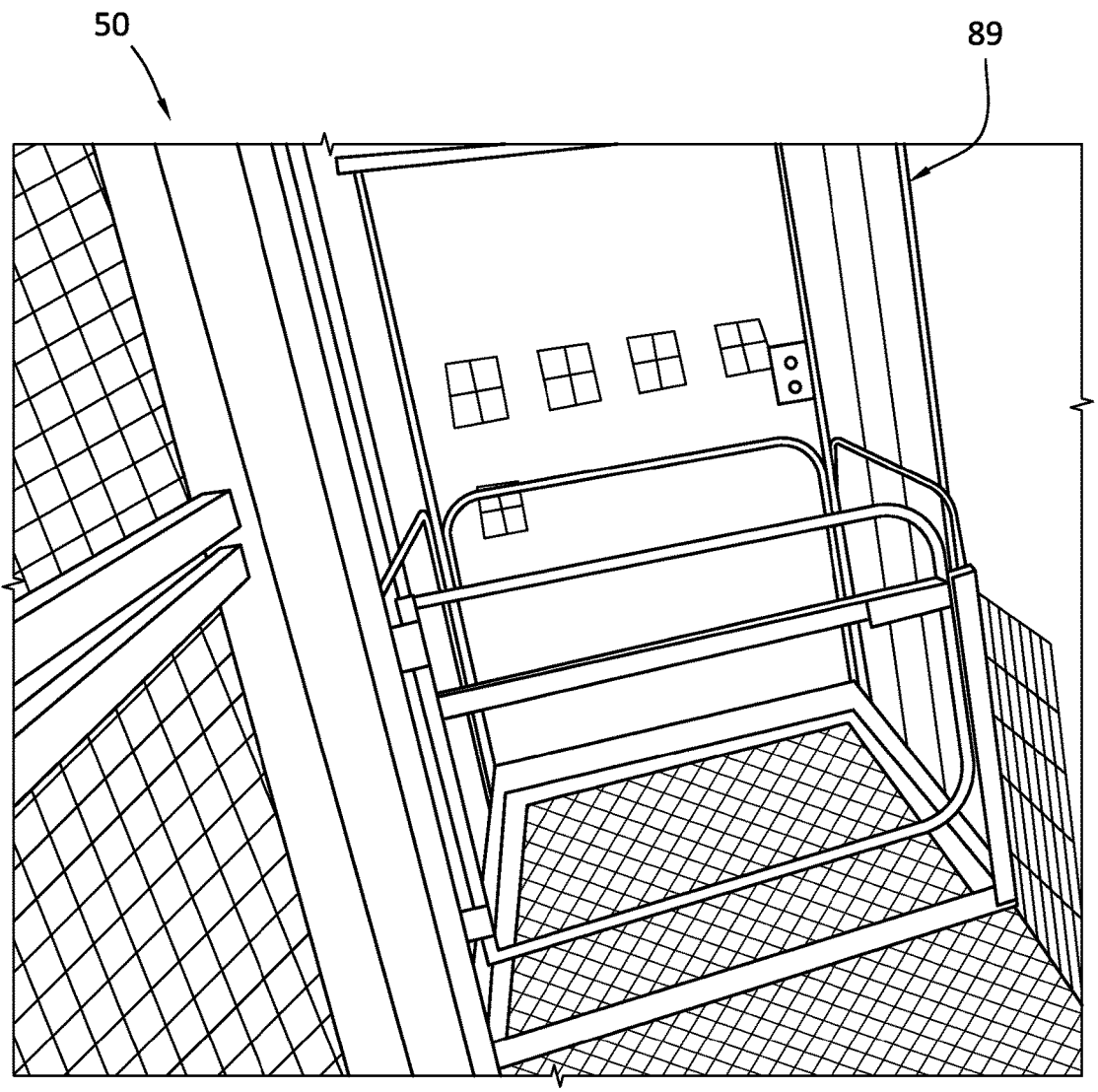
FIG. 12 illustrates a corresponding VR representation of a VR elevator.

FIG. 11 illustrates the VR participant 121 in one embodiment of an elevator simulator 80 comprising an enclosure 82 made of bars, thatched plates, and/or gates. The simulator 80 may additionally comprise a controller 85 such as a switch or buttons mounted to the enclosure 82. The elevator simulator 80 is substantially stationary, moving over a span of only a few centimeters or inches to create an illusion of ascending or descending. FIG. 12 illustrates a VR representation 50 of a corresponding VR elevator 89. The VR elevator 89 is shown ascending or descending one or more floors while the corresponding elevator simulator 80 vibrates a platform (not shown) that is coupled to the enclosure 82. The elevator simulator 80 is further described in FIG. 18.

Figure 13:
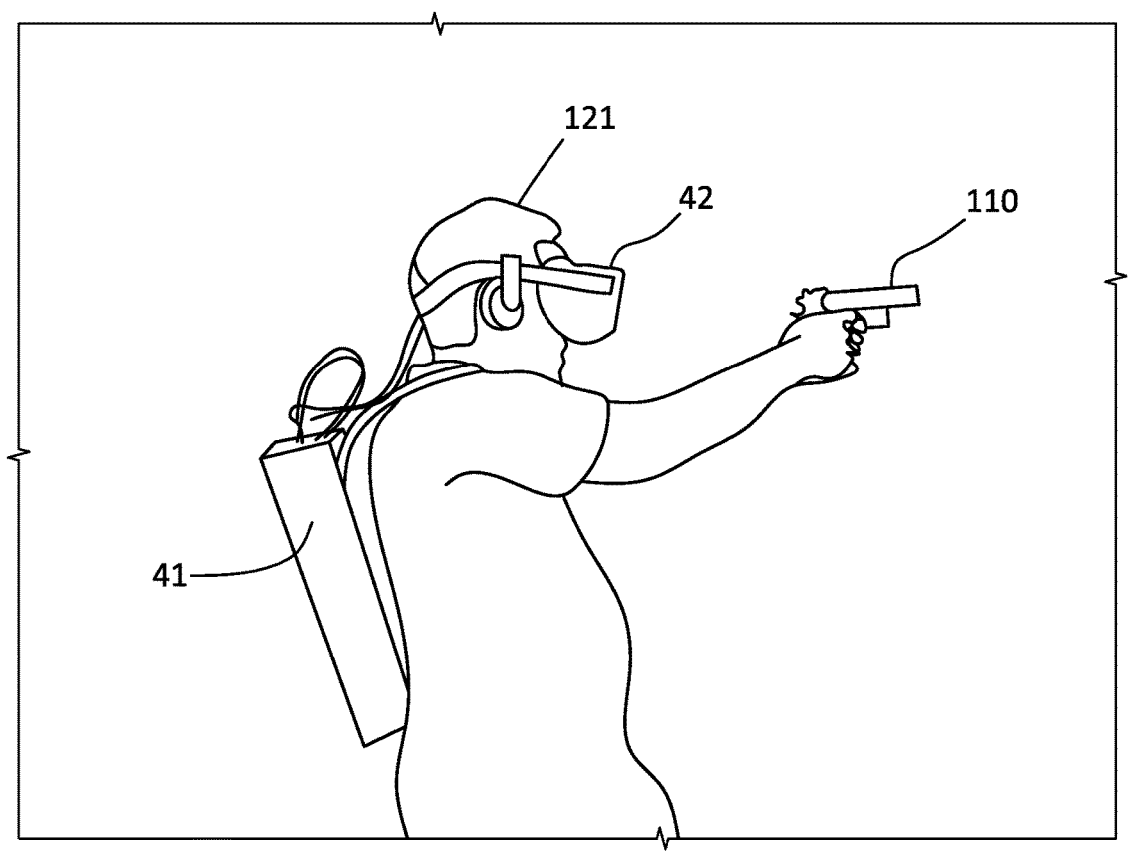
FIG. 13 illustrates a VR participant holding a firearm prop.
Figure 14:
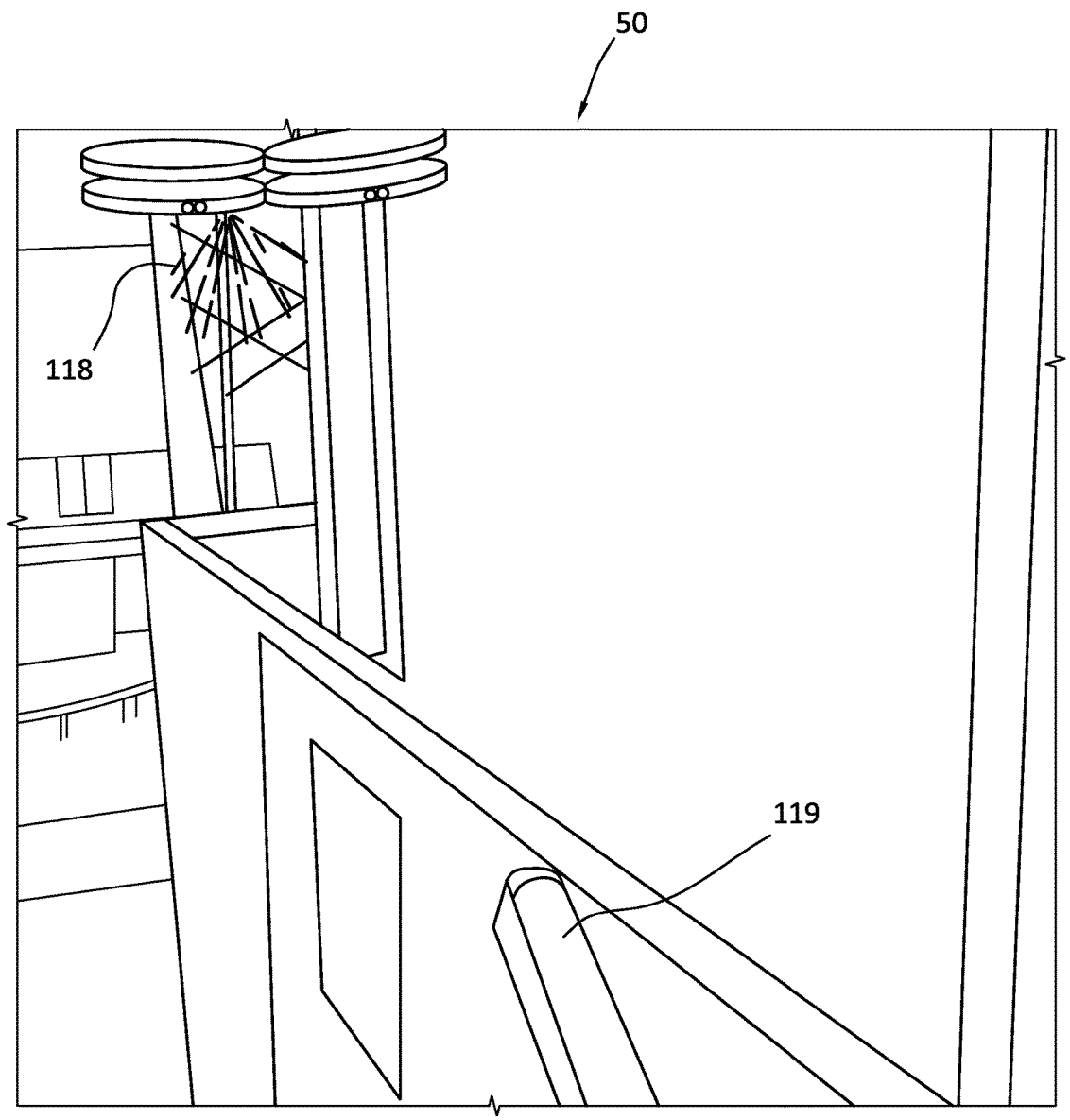
FIG. 14 illustrates a corresponding VR representation provided to the VR participant as he holds the firearm prop.

FIG. 13 illustrates the VR participant 121 holding and pointing a firearm prop 110. FIG. 14 illustrates a corresponding VR representation 50 provided to the VR participant 121 as he holds, points, and shoots the firearm prop 110. The VR representation 50 includes a depiction of a VR firearm 119 that is pointed in a direction that corresponds to the direction in which the firearm prop 110 is pointed. The VR representation 50 also depicts kill simulations 118 in response to the VR participant 121 "firing" the firearm 110.

Figure 15:
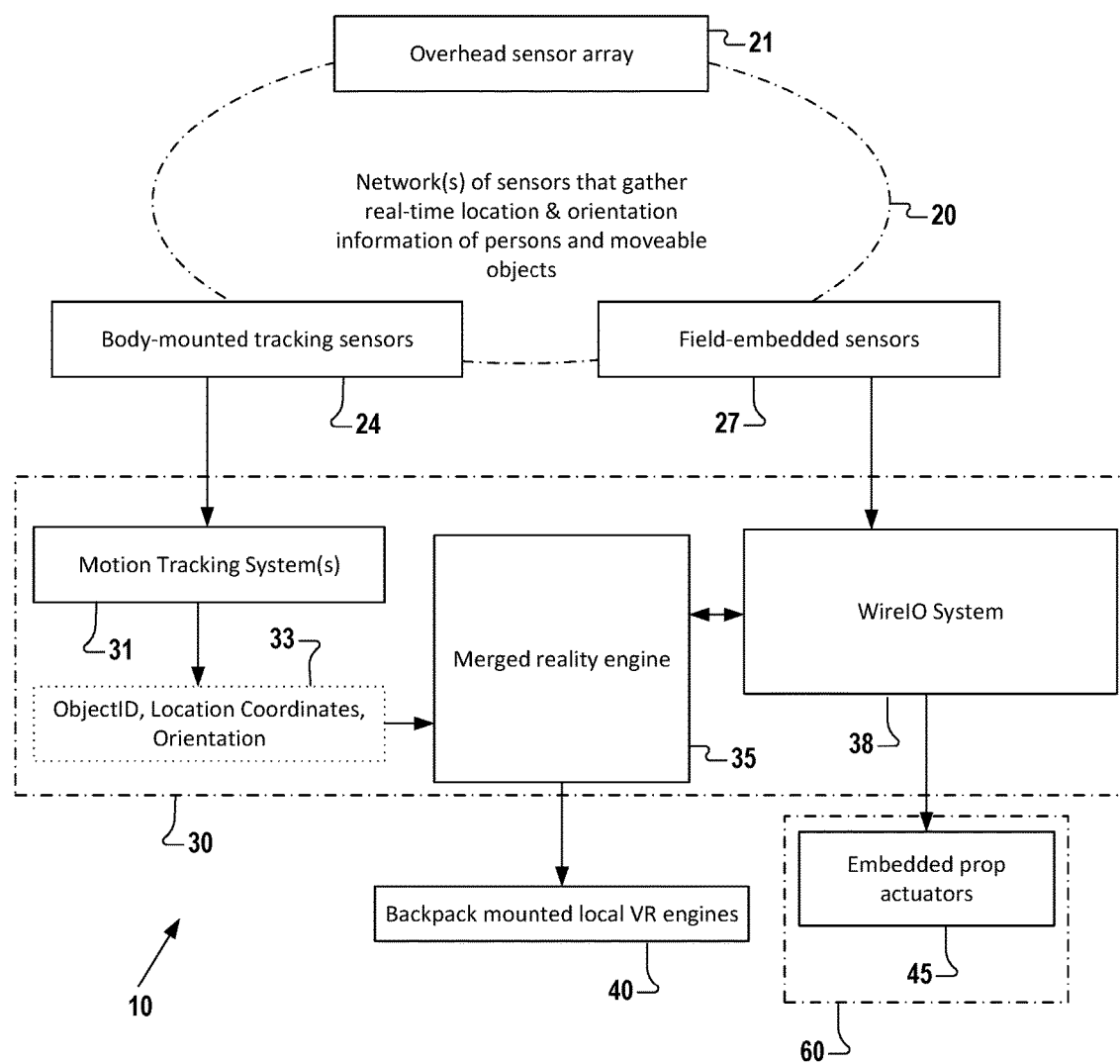
FIG. 15 is a block diagram illustrating one embodiment of a plurality of devices and systems used to augment or enhance a VR experience using a grid-aligned arrangement of props on a modular stage.

FIG. 15 is a block diagram illustrating one embodiment of an interconnected system 10 of devices and systems used to augment or enhance a VR experience using a grid-aligned arrangement 11, 19 of stage accessories 14, 16, 18, 70, 110, 120 on a modular stage 1. The system 10 comprises a plurality of sensors 20, a plurality of digital systems 30, a plurality of backpack-mounted local VR engines 40, and a plurality of physical "smart props" 60 that are simultaneously represented in a corresponding VR representation 50 experienced by VR participants 121. Some of the smart props 60 are interactive and designed for VR participants 121 to carry by hand as part of the VR experience. Some smart props 60 have embedded prop actuators 45 to actuate mechanical, electrical, tactile, or heating elements incorporated into the smart props 60.

The plurality of sensors 20 include an overhead sensor array 21, body-mounted tracking sensors 24 that are mounted on equipment (such as backpacks 41 and/or headsets 42) carried by the VR participants 121, and field-embedded sensors 27 embedded in one or more of the set pieces or props 60 of the staged physical environment.

The plurality of digital systems 30 comprise motion tracking systems 31, a wire-based input-output system 38 (WireIO), and a merged reality engine 35. The motion tracking systems 31 detect the position and orientation of each VR participant 121 and each VR participant 121's head and hands, as well as of smart props 60 used in the staged physical environment. Suitable motion tracking technology already exists. For example, U.S. Pat. No. 8,638,989, issued Jan. 28, 2014, describes technology that tracks a VR participant's hands in the virtual world so that the VR experience can track the hands.

The motion tracking systems 31 send packets 33 of information—which include the location coordinates, orientation, and uniquely identifying information for each VR participant 121 or object—to the merged reality engine 35. The wire-based input-output system 38 (WireIO) is a network of wired actuators 45 and sensors that are embedded in walls, doors, windows, smart props 60 and/or other objects of the physical environment. Many of the wired sensors sense when a stage accessory 14, 16, 18, 70, 110, 120, such as a door, a drawer, a door knob, or an elevator simulator platform, is opened or turned.

The merged reality engine 35 controls the actuators 45 to produce motion, direct a simulated breeze or wind (air), generate ambient heat, lock or unlock doors and windows, and/or generate other physical phenomenon directed to and felt by the VR participant 121. The generated motions and other physical phenomena are accompanied by VR optics and sound that depict a VR representation 50 with a consistent surrounding and objects. Suitable technology for this purpose already exists. For example, U.S. Patent Pub. No. 2016/0275722, published Sep. 22, 2016 and incorporated herein by reference, describes systems and methods for merging a simulation experience with physical objects and sensory stimuli in a controlled physical environment.

The VR representation 50 includes VR representations of objects that correspond—in apparent physical location and orientation—to the staged physical environment. As the VR participant 121 moves through the staged physical environment, the VR participant 121 is presented with a VR experience that is consistent with, and that corresponds to, the VR participant 121's movement in the VR world. The VR world may be scaled differently than the physical world. For example, a wall that in the staged physical world is 20 feet away may appear 40 feet away in the VR world, but as the VR participant 121 approaches that wall, it appears to the VR participant 121 that he/she is advancing faster as he/she actually is. Although the scales differ, the physical world is perceived by touch and other non-visual senses to be "consistent" and to "correspond" with the virtual world. Also, the texture of doorknobs, smart props 60, and other objects within the staged physical environment need not exactly match the textures that are displayed to the VR participant 121's eyes in the VR world. The existence of other sensory feedbacks may make a texture "feel" more like what the VR participant 121 expects to feel than it otherwise would.

The merged reality engine 35 is configured with information to enhance a VR representation 50. The merged reality engine 35 receives and processes motion capture and other sensory feedback, and uses that information to coordinate the physical "world" that exists on the stage 1 with the VR representation 50 of that world. The merged reality engine 35 tracks where each VR participant 121 is located and oriented within the staged physical environment, whether one of the VR participant 121's hands is reaching out to or holding a prop 60 in the staged physical environment, and where the VR participant 121's head and/or eyes are pointing. The merged reality engine 35 provides physical coordination by controlling doors, windows, fans, heaters, simulated elevators, and other smart props 60 in the staged physical environment. The VR coordination comprises sending signals regarding sensed conditions, VR participant 121 and prop locations, and actuator states to one or more VR engines. For example, if a VR participant 121 moves a prop 60, then the merged reality engine 35 provides information to the VR engines 40 to reposition and/or reorient the corresponding virtual props to match the participant-altered location and orientation of the physical props 60.

In one embodiment, a single VR engine provides individualized VR experiences to each of the VR participants 121. In what, with current technology, is perhaps a more practical embodiment, separate VR engines 40—each running on a backpack-mounted computer—are provided to each VR participant 121. The coordination of the physical and virtual worlds ensures that the physical environment combines with the VR optics and audio to provide a convincingly consistent sensory experience.

Figure 16:
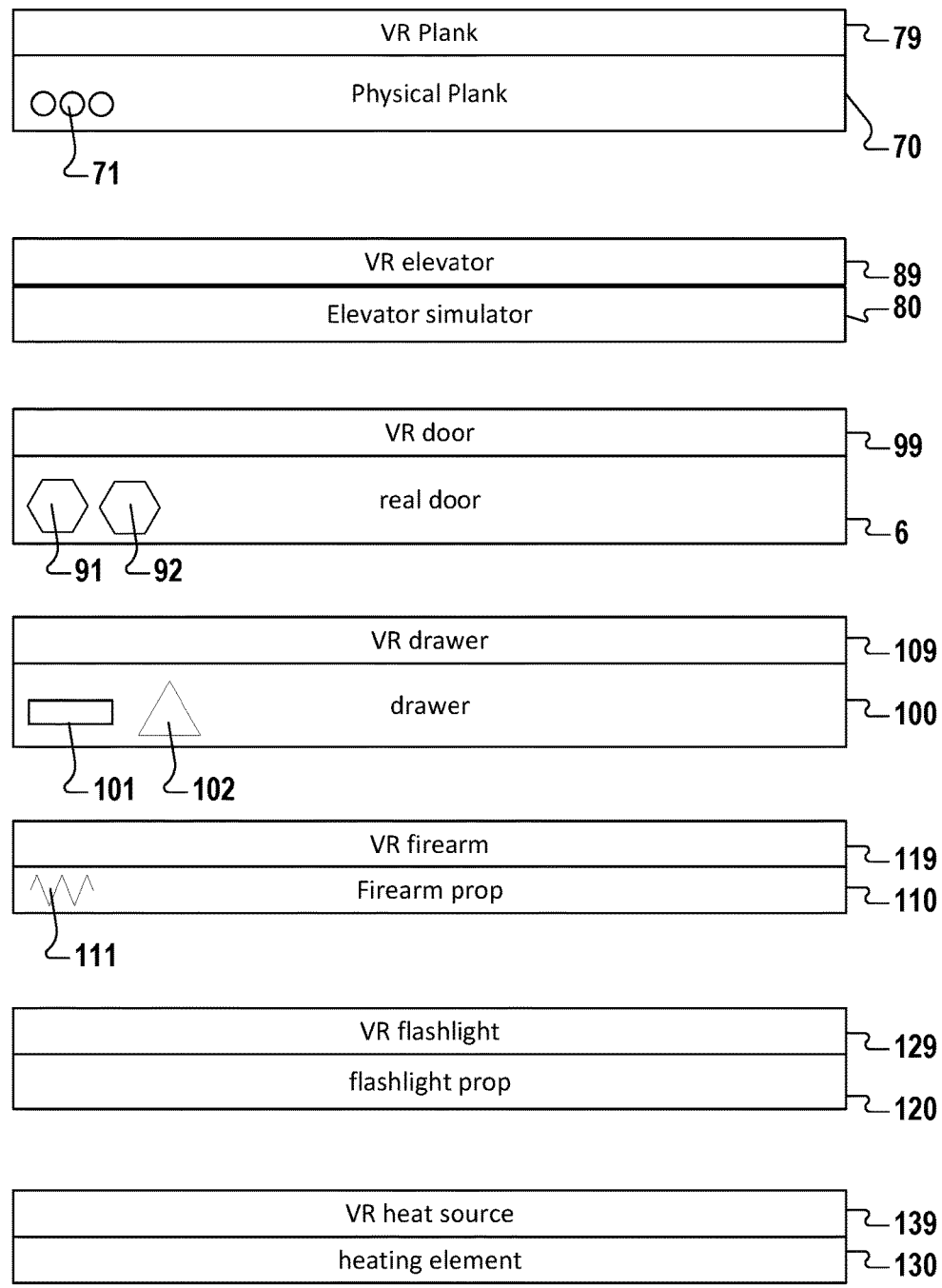
FIG. 16 is a block diagram illustrating one embodiment of a kit of VR-represented "smart props" that are used to enhance a VR experience.

FIG. 16 illustrates a kit 11 of stage accessories that are used inside an exemplary staged physical environment to enhance a VR experience. Seven set pieces and smart props 60 are illustrated. Two of them—a firearm 110 and a flashlight 120—are designed for a VR participant 121 to hold and carry by hand as part of the VR experience. Two more—a drawer 100 and a door 6—are designed to for a VR participant 121 to open to reveal a room or compartment. Another two—a plank 70 and an elevator simulator 80—are designed for a VR participant 121 to walk on and/or operate. Also, a heating element 130 is designed to provide a source of heat corresponding to a visual depiction of a heat source—such as a boiler—in the virtual world. Many more set pieces and smart props 60 are contemplated, including, for example, light saber props, fencing gear props, whips, tennis rackets, golf clubs, bats, balls, chair props, and a simulated moving platform. Further examples include land, sea, and air-based vehicular props. For example, a stationary rowing machine, in one embodiment, would enhance a VR simulation of rowing a boat across a pond or channel. Also contemplated are a game controller or remote that enables a VR participant 121 to alter or the VR scenery or switch the VR scenery between a plurality of VR representations 50 that correspond to the staged physical environment. Of course, the selection and arrangement 10 of smart props 60 will be particular to the design of the staged physical environment and the VR representation 50 it is created to enhance.

The physical plank 70, which is also illustrated in FIGS. 1, 2 and 9, comprises a slightly warped wooden board. As illustrated in FIG. 10, the VR representation 50 visually and audibly simulates a corresponding VR plank 79. The physical plank 70 is embedded with a self-identifying beacon 61 (FIG. 17)—for example, LED lights powered by a battery pack and controlled by a small programmable microcontroller 63 (FIG. 17) that sets a sequence for illuminating the LED lights—that allows a motion tracking system 31 to track the position and orientation of the plank 70. In one embodiment, the physical plank 70 is also embedded with a sensor 66 (FIG. 17)—such as an accelerometer—to detect wobble in the board. The microcontroller 63 wirelessly communicates—using, for example, Wi-Fi or Bluetooth—the accelerometer output to the merged reality engine 35, which is configured to generate a VR representation 50 of a wobble in the corresponding VR plank 79.

Figure 18:
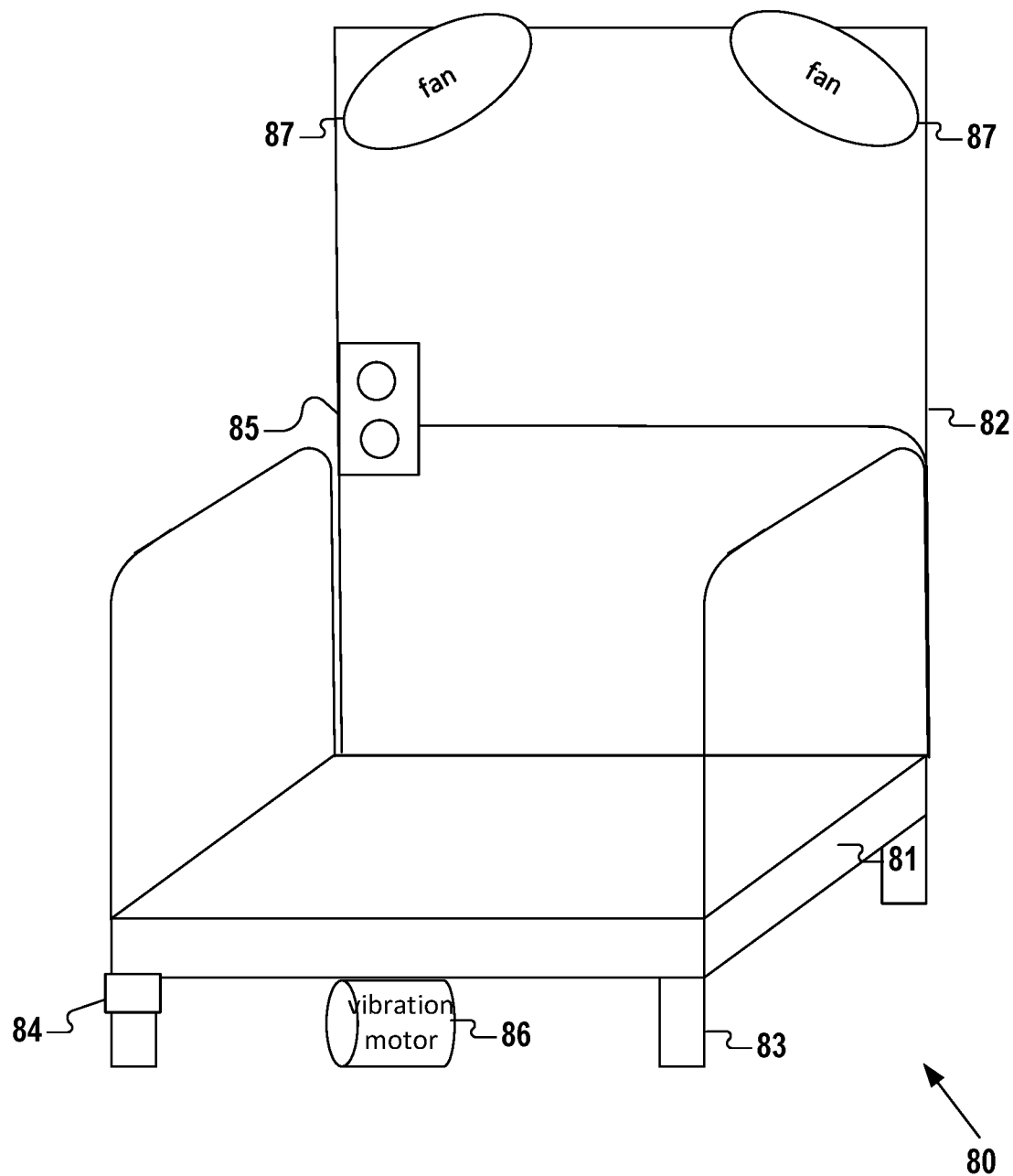
FIG. 18 is a functional illustration of the elevator simulator of FIG. 11.

The elevator simulator 80, which is partially illustrated in FIG. 11 and more fully illustrated in FIG. 18, comprises a platform 81, an enclosure 82 (such as bars or walls and a gate or a door), a plurality of springs 83 (or pneumatic cylinders, pistons, or other actuators) supporting the platform 81, and a vibration motor 86 to vibrate the springs 83 to create a sensation of elevator movement. Optionally, one or more sensors 84 sense when VR participants 121 have entered or exited the simulator 80. Controllers 85 such as a switch or buttons are provided for selecting a floor or elevator direction and/or causing the VR elevator 89 to ascend or descend. Fans 87 project air on VR participants 121 to augment a VR depiction of an open-air elevator with the sensation of rapidly traveling through one. As illustrated in FIG. 12, the corresponding VR representation 50 visually and audibly simulates a corresponding, but apparently fully-functioning, VR elevator 89. While in a typical embodiment, the actual appearance of the elevator simulator 80 may be relatively simple and plain, the VR elevator 89 is depicted in a more visually engaging way.

The one or more sensors 84—e.g., a load sensor, a motion sensor, and/or an accelerometer—detect a person on the elevator simulator 80. As noted before, the springs 83 are vibrated by the vibration movement to create a sensation of movement. Feedback from testers indicates this to be sufficient to create a convincing sensation. But more elaborate simulators are also within the scope of the invention. In one alternative embodiment, for example, the springs 83 are pre-wound to a preset amount of compression or stretch from the springs' neutral positions. To simulate an elevator ascent, the springs 83 are pre-wound into the preset compressed position, and then suddenly released to simulate the start of an elevator rising. To simulate an elevator descent, the springs 83 are pre-wound into a preset stretched position, and then suddenly released to simulate the elevator lowering. The vibration motor 86 simulates the travel of the elevator 80 from the start position through the end of travel. To simulate the elevator 80 coming to a stop, a cam (not shown) or other mechanical device is driven by a second motor to cause the springs to compress in a simulated descent or stretch in a simulated ascent followed by a second release, preferably to the position having the preset amount of compression or stretch to simulate the opposite movement of the elevator 80. This simulated "bounce" simulates the elevator 80 coming to a stop.

The merged reality engine 35 controls the elevator simulator 80. As the elevator simulator 80 simulates an ascent or descent and a stop, the merged reality engine 35 communicates information to the backpack-mounted VR engines 40. To VR participants 121 for which the VR elevator 89 is in their field of view, the VR engines 40 simultaneously present VR optics and auditory feedback depicting the corresponding VR elevator 89 traveling between one or more floors.

Advantageously, the elevator simulator 80 does not actually travel between floors. The platform 84 travels only a slight amount vertically—for example, less than 1 foot and even 4 inches or less—and yet the experience, when paired with the optics of the corresponding VR elevator 89, is genuinely realistic to nearly all, and certainly most, VR participants 121.

Also, advantageously, in one embodiment, the VR representation 50 depicts two or more floors using a staged single-floor physical environment. The elevator simulator 80 is used to "travel" between them. The same walls, doors, windows, smart props, and other objects in the staged environment take on different appearances in each floor of the VR representation 50. This enables a provider of the staged VR environment to simulate an experience that appears much larger and more varied than the modular stage 1 and its assorted accessories themselves.

Returning to FIG. 16, the physical door 6 comprises a suitable door—such as a conventional door—with a knob and hinges. The physical door 6 includes rotary encoders 91 and 92 for the knob and one hinge, respectively. The rotary encoders 91 and 92, which may be analog or digital, generate signals indicative of the angular position of the knob and door. The merged reality engine 35 uses the signals to generate a VR representation 50 that visually and audibly simulates a corresponding VR door 99.

In one exemplary embodiment, the physical door 6 is an ordinary-looking metallic commercial door that is in good condition (few if any dents or scratches or paint chips) and lacks a frightening appearance. The hinges are lubricated so that they do not squeak when the door is opened or closed. A door safety mechanism (not shown), powered by a spring, hydraulics, or other mechanism, creates resistance to the opening and/or closing of the door 6. In one VR representation 50, such as shown in FIG. 8, the VR door 99 appears to be an industrial metal door covered in badly chipped paint. A virtual danger warning sign hangs on the VR door 99. As the door 6 is opened, the VR representation 50 presents squeaky noises as well as noises of the VR area behind the door 6. VR cobwebs are illustrated stretching and then breaking, an illustration that is further enhanced when the VR participant 121's face passes through real-world sticky or tacky threads or other filaments hanging down into the staged physical environment. In a different VR representation 50, such as shown in FIG. 6, the VR door 99 appears to be a wooden door that is part of a log cabin building.

The physical drawer 100 is part of a filing cabinet, desk, dresser, or other piece of furniture or equipment. In one embodiment, the drawer 100 is equipped with a touch sensor 102 to detect touch, and a linear encoder 101 to detect the drawer position. In an alternative embodiment, a small door or lid, such as a safe door, is provided in place of or in addition to the physical drawer 100. A handheld prop 60—such as a firearm prop 110—is preferably placed in the drawer, safe, or other compartment, for a VR participant 121 to pick up and use.

The VR representation 50 visually and audibly simulates a corresponding VR drawer 109 or (in the alternative embodiment) door or lid, as illustrated, for example in the filing cabinet depicted in FIG. 8. If a real handheld smart prop 60 is in the drawer 100 or compartment, then the VR representation 50 simultaneously depicts a corresponding virtual handheld prop.

Figure 17:
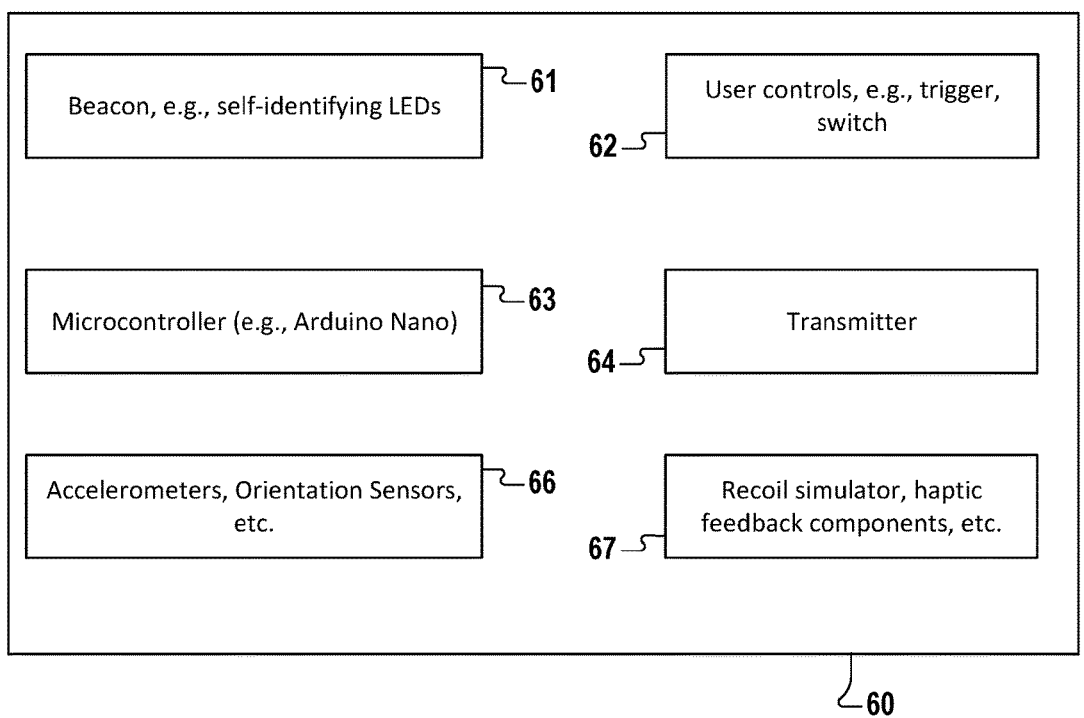
FIG. 17 is a block diagram illustrating components that are found in various embodiments of a VR-represented object.

Skipping briefly ahead, FIG. 17 illustrates some standard components of smart handheld props 60, many of which are incorporated into the firearm prop 110 and the flashlight prop 120 identified in FIG. 16. These standard components include a tracking beacon 61, user controls 62, a microcontroller 63, sensors 66, a transmitter 64, and haptic feedback components 67. It will be noted that the sensors 66 and/or transmitter 64 may be incorporated into or on the microcontroller 63. In one embodiment, the beacon 61 comprises self-identifying LEDs that are used by a motion-tracking device, such as OptiTrack®, to determine the position and orientation of the device 60. It will be understood that any particular smart prop 60 may have fewer than all of the components illustrated in FIG. 17, as well as one or more components not illustrated in FIG. 17. Generally, the standard components of a smart prop 60 contribute to the delivery of a cohesive VR experience in which the physical prop 60 complements, rather than detracts from, the realism of the VR experience.

Returning back, FIG. 16 also illustrates a firearm prop 110. The firearm prop 110 is a handheld device with a gun-shaped form, including a handle, a barrel-like section, a trigger or switch, and a cocking device. At least most of the standard components of FIG. 17 are incorporated into the firearm prop 110. The trigger of the firearm prop 110, for example, would constitute a type of user control 62. In one embodiment, the firearm prop 110 is equipped with a haptic feedback component 67 in the form of a trigger-activated spring recoil device 111 to simulate the firing recoil of a real gun.

The firearm prop 110 may be an actual firearm that is unarmed and modified for use in the staged physical environment. Preferably, the firearm prop 110 replicates portions—e.g., substantially only the portions of a firearm that are typically gripped, pushed, pulled, or depressed—of the form of any actual firearm, without including a chamber operable to load real ammunition. For example, the firearm prop 110 may be a lightweight polymeric replica of an actual firearm. The lightweight design makes it less susceptible to being used to actually harm—e.g., as a projectile or a battering device—another VR participant 121.

The VR representation 50 visually and audibly simulates the use of the firearm prop 110. Whereas the firearm prop 110 is unable to actually fire ammunition, the VR representation 50 simulates the sound and light effects of ammunition being fired as the VR participant 121 depresses the corresponding trigger—as well as the effects on the simulated living and nonliving objects impacted by the simulated shots.

Advantageously, the motion tracking systems 31 detect the position and orientation of both the handheld smart props 60 (such as the firearm prop 110) and the position and orientation of the VR participant 121's hands. Moreover, touch sensors and accelerometers incorporated into the firearm prop 110 enable the motion tracking systems 31 to detect whether the VR participant 121's hand is gripping and holding the firearm prop 100. The merged reality engine 35 processes this information to enable the VR engines 40 to accurately depict the VR depiction of the VR participant 121 as either not touching, merely touching or actually gripping and holding the VR firearm 119. The merged reality engine 35 also depicts a position and orientation of the corresponding VR firearm 119 that matches the position and orientation of the firearm prop 110.

In other embodiments, not shown, physical smart props 60 for laser guns, light sabers, knives, swords, and hammers are also provided. Like the firearm prop 110, they are equipped with components that enable them to be simulated in the VR representation 50.

The handheld flashlight 120 preferably comprises a real polymeric flashlight case or shell with a user-operable switch that has been modified with many of the standard components of a smart prop 60, including sensors 66, a microcontroller 63, and a transmitter 64 (which may be incorporated into the microcontroller 63). The sensors 66 detect whether the flashlight prop 120 is being held, the position and orientation of the flashlight prop 120, and whether the flashlight prop 120 is "switched" on or off. An actual flashlight bulb is unnecessary, because VR participants 121 would not see any actual light coming out of the flashlight 120, but rather the virtual depiction within the VR goggles/headset 42 of the illumination created by a virtual flashlight 129. Also, some of the space reserved in a conventional flashlight for batteries is preferably used to house the sensors 66, microcontroller 63, and transmitter 64.

The physical heating element 130 is a real-world device, such as a space heater, infrared heat lamps, or an oven (which may be connected to a duct having a microcontroller-operated exit door or valve). The VR representation 50 illustrates a corresponding VR heat source 139, such as a boiler, a raging fire, or a boiling pool of molten metal. The physical heating element 130 may stay on throughout the course of the VR experience. Alternatively, the physical heating element 130 or valves or windows or doors positioned to alternatively block or allow the release of heat are controlled to generate and provide sudden bursts of heat. Advantageously, the real heat felt by VR participants 121 dramatically enhances the sense of realism experienced by a VR participant 121.

As illustrated above, a smart prop 60 may be a replica or modified version (or both) of a common utilitarian real-world object. These reinforce the typical expectations a VR participant 121 would have about the corresponding VR object. However, there are many other types of contemplated smart props 60 that do not have the form or feel of a common utilitarian real-world object. Such objects may reinforce the elements of suspense and surprise associated with the corresponding VR object.

Figure 19:
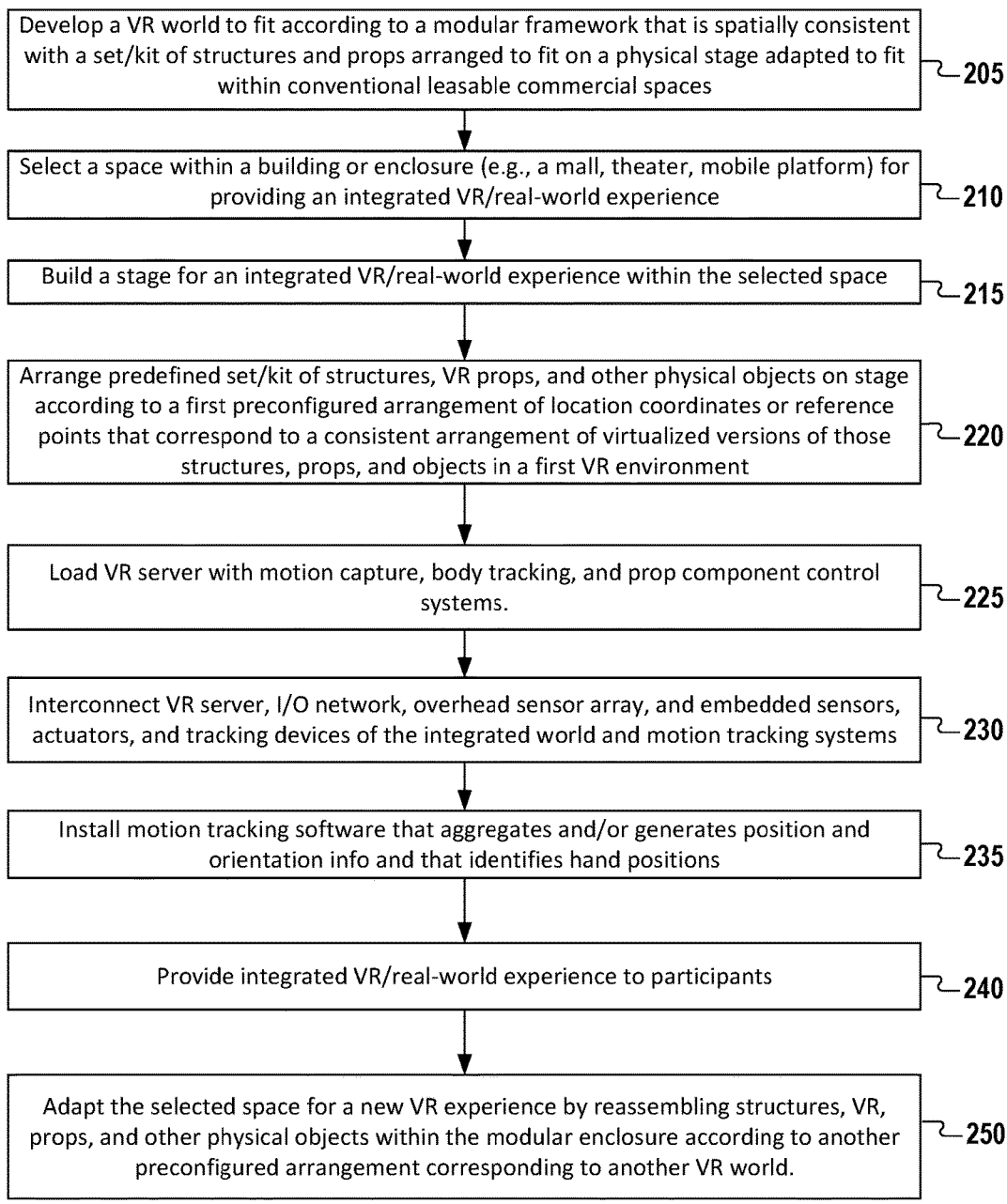
FIG. 19 illustrates one embodiment of a method of developing, deploying, and implementing a modular VR attraction.

FIG. 19 illustrates one embodiment of a method of developing, implementing, and deploying a modular VR attraction. The method comprises a plurality of steps, some of which are re-orderable.

In step 205, using a commercially available VR development software program, create one or more VR representations 50 to which a physical modular stage 1 and its modular stage accessories can be fit, in a spatially realistic fashion, to enhance the illusion created by the VR representations 50. In one embodiment, the modular stage and stage accessories are pre-existing, and a previous VR representation 50 has been created for use with the modular stage and stage accessories. In an alternative embodiment, the modular stage and stage accessories are created after the VR representation 50 is created to augment and enhance that VR representation 50 and its various spatial adaptations.

Figure 20:
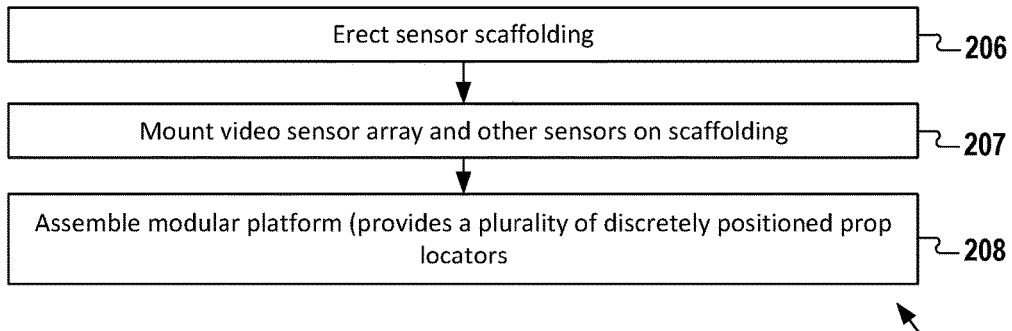
FIG. 20 illustrates one embodiment of a method of building a stage for the modular VR attraction.
Figure 21:
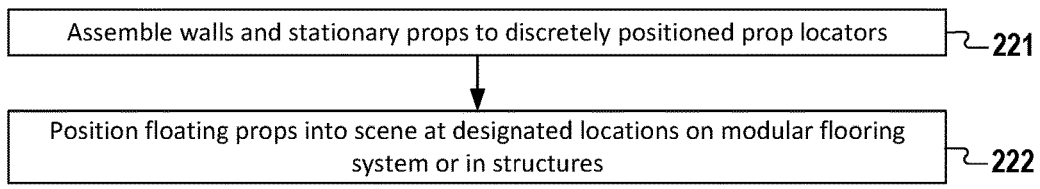
FIG. 21 illustrates one embodiment of a method of assembling stage accessories for the modular VR attraction.

In step 210, select a space within a building or enclosure (e.g., a mall, theater, mobile platform) for providing an integrated VR/real-world experience. In step 215, assemble the modular stage 1 within the selected space. FIG. 20 elaborates on this step. In step 220, arrange a predefined set or kit 11 of set pieces and props 60 on the stage 1. More specifically, arrange the accessories according to a first preconfigured stage plan or arrangement 11 of location coordinates or reference points that correspond to a consistent arrangement of virtualized versions of those set pieces and props 60 in a first VR environment. Also connect power lines 13 and signal lines 12 to accessories that need them. FIG. 21 further elaborates on this step. In step 221, assemble set pieces (e.g., walls) and stationary props 60 to discretely positioned accessory mounts 7. In step 222, position floating props 60 (e.g., plank, gun) at designated locations on the modular stage 1 or in or on other accessories on the stage 1.

Figure 22:
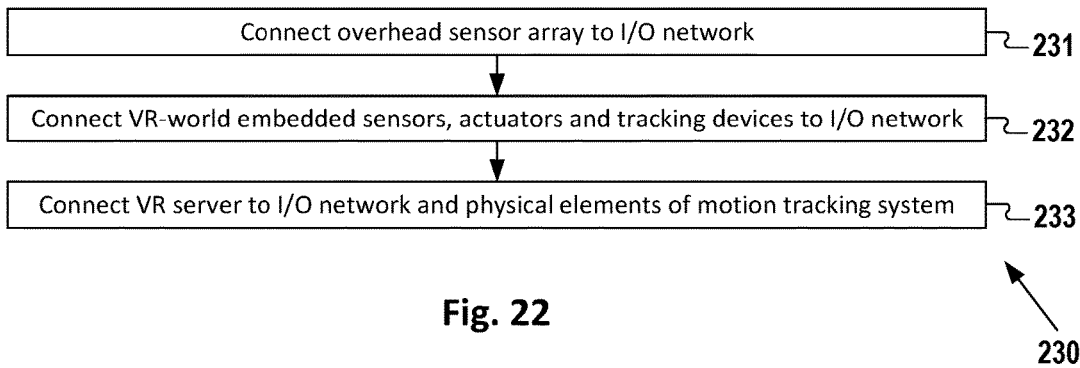
FIG. 22 illustrates one embodiment of a method of digitally interconnecting the smart props with systems that service the VR experience.

In step 225, load a VR server with motion capture, body tracking, and prop component control systems. Commercial packages are available that may be suitable, such as OptiTrack®. In step 230, interconnect VR server, I/O network, overhead sensor array, and embedded sensors, actuators, and tracking devices of the integrated world and motion tracking systems. FIG. 22 further elaborates on this step. In step 235, install motion tracking software (e.g., OptiTrack Motive®) that aggregates and/or generates position and orientation info and that identifies hand positions.

Figure 23:
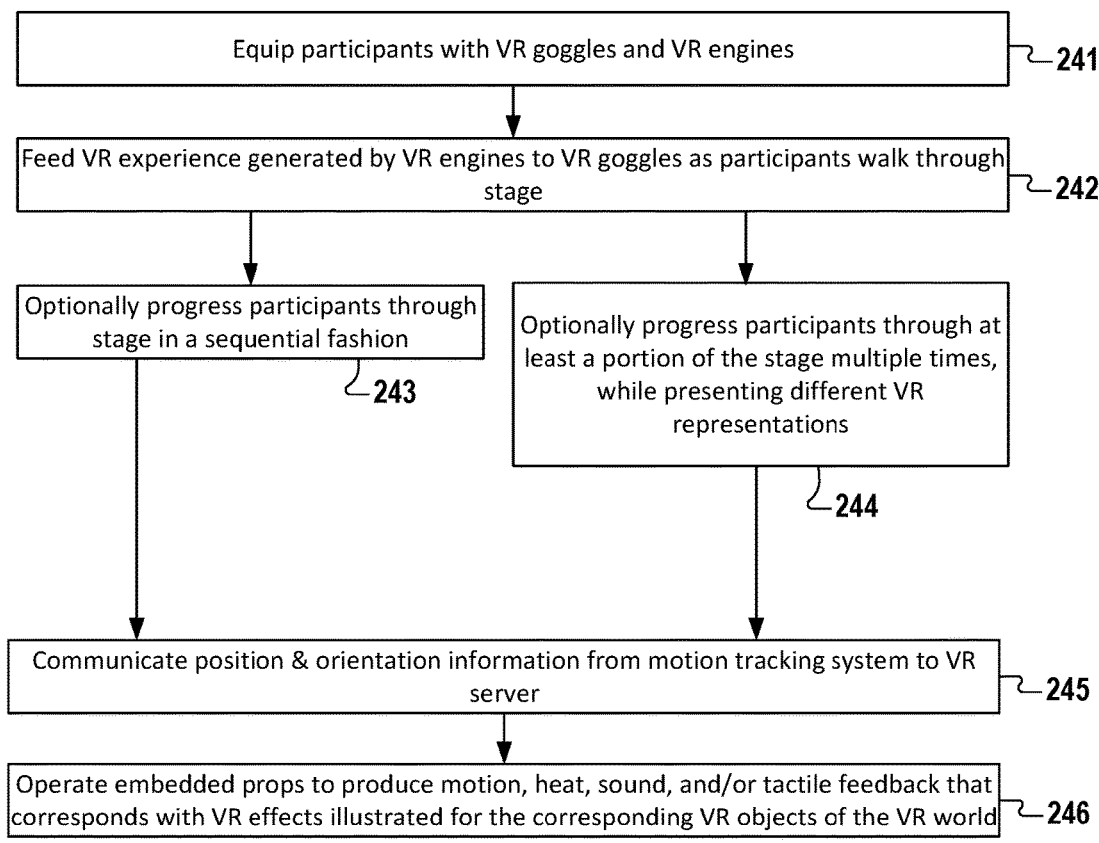
FIG. 23 illustrates one embodiment of a method of providing a real-world-integrated VR experience to participants.

In step 240, provide integrated VR/real-world experience to VR participants 121. FIG. 23 elaborates on this step.

In step 250, adapt the selected space for a new VR experience by reassembling structures, VR, props, and other physical objects within the modular enclosure according to another preconfigured stage plan or arrangement 19 corresponding to another VR representation 50.

It will be apparent to one of ordinary skill in the art that some of the steps of FIG. 19 can be re-arranged without affecting the end-user experience. Furthermore, some steps can be modified or omitted. Whether such rearrangements or modifications are within the scope of the invention depends, of course, on the language of the claims.

FIG. 20 illustrates elements of a method 205 of assembling a stage 1 for the modular VR attraction. In step 206, erect sensor scaffolding (e.g., stage lighting stands & trusses). In step 207, mount video sensor array and other sensors on scaffolding. In step 208, assemble the modular platform 3 and any perimeter walls 5.

FIG. 21 illustrates one embodiment of a method 220 of setting up stage accessories for the modular VR attraction. In step 222, fix walls 5 and stationary props 60 to discretely positioned accessory mounts 7, for example, by inserting fittings 17 such as pegs attached to the walls 5 and props 60 into the accessory mounts 7, such as peg holes, of the stage platform. These accessories are designed to be restricted to a fixed position on the stage platform 3, and are characterized within the VR world as being fixed. In step 222, position floating props 60 that are not intended to be restricted to a fixed or stationary position on the stage platform 3—for example, the plank 70 or the firearm 110—on the stage 1 at more generalized designated locations (e.g., specifying one or more stage squares).

FIG. 22 elaborates on step 230 of FIG. 18. It illustrates one embodiment of a method of digitally interconnecting the smart props 60 with systems that service the VR experience. In step 231, connect the overhead sensor array to the I/O network 20. In step 232, connect VR-world embedded sensors, actuators and tracking devices to the I/O network 20. In step 233, connect the VR server hosting the merged reality engine 35 to the I/O network 20 and the physical elements of the motion tracking system(s) 31.

FIG. 23 illustrates one embodiment of the step 240 of providing a real-world-integrated VR experience to VR participants 121. In step 241, equip VR participants 121 with VR goggles (e.g., Oculus Rift®) and VR engines (e.g., backpacks). In step 242, feed VR experience generated by VR engines to VR goggles as VR participants 121 walk through the stage 1.

VR participants 121 may be advanced through the stage 1 in a plurality of different fashions. In step 243, VR participants 121 are progressed through the stage 1 a single time in a sequential fashion. In alternative step 244, VR participants 121 are advanced through at least a portion of the stage 1 multiple times, while coupling different traverses of the same stage section with different VR representations 50. This means that the objects of the multiply-traversed stage sections are associated with a plurality of VR representations 50, each one specific to a different traverse.

In step 245, communicate position & orientation information from the motion tracking system(s) 31 to the VR server. In step 246, operate embedded set pieces and props 60 to produce motion, heat, sound, and/or tactile feedback that corresponds with VR effects illustrated for the corresponding VR objects of the VR representation 50.

Various embodiments of the present invention use a computer system and a computer network for executing one or more computer programs to assimilate sensory information, control actuable features—such as motors, fans, heaters, and door locks—of stage accessories, and generate the VR representations.

Figure 24:
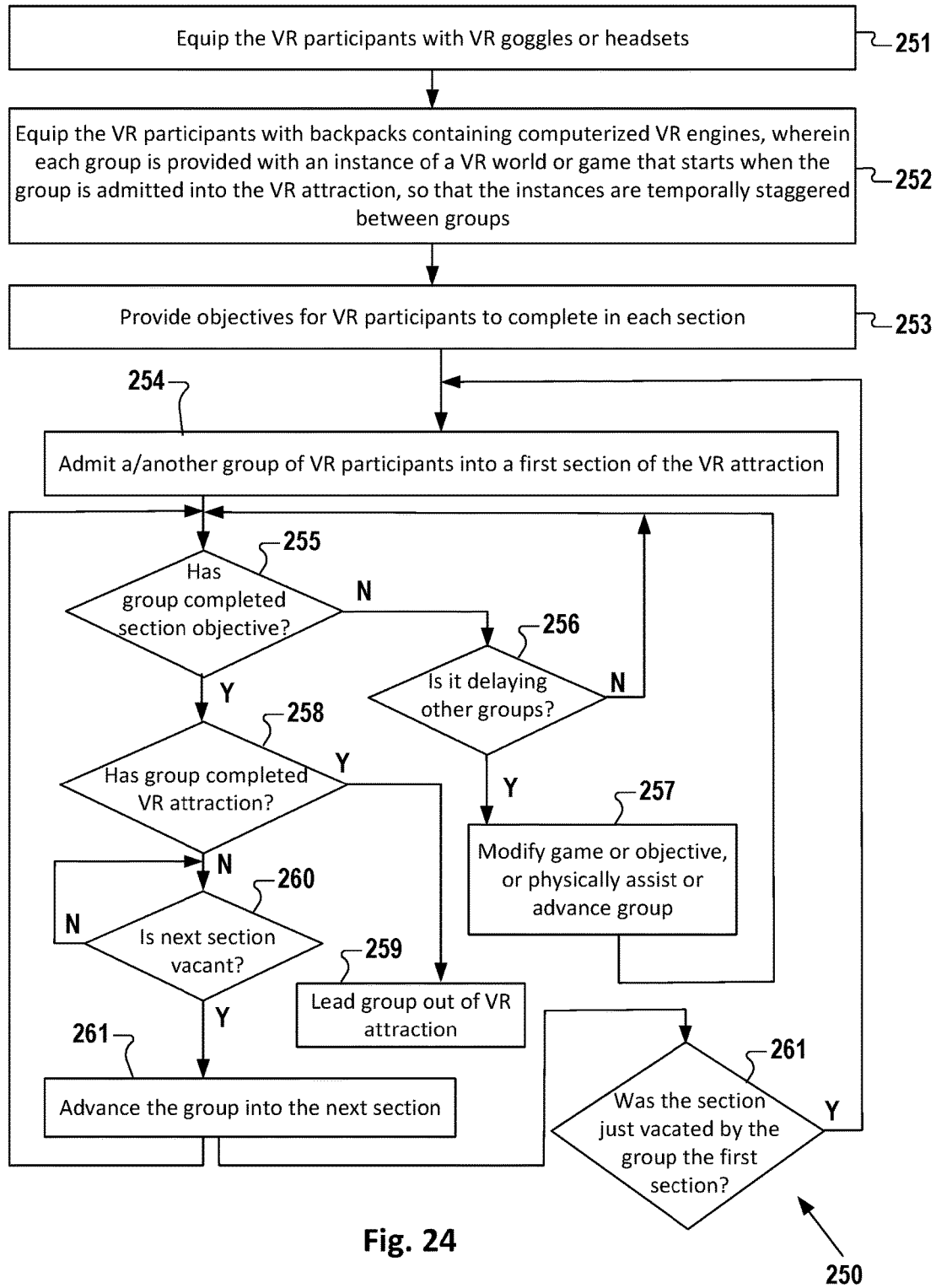
FIG. 24 illustrates a method of providing a VR attraction to a plurality of groups of VR participants in a staggered fashion.

FIG. 24 illustrates a method 250 of providing a VR attraction to a plurality of VR participants 121 in a staggered fashion, staggered by group or individual. The method 250 is described herein with respect to groups, but would be equally applicable to an attraction in which one participant is let in at a time. Moreover, the method 250 is not strictly limited to the particular order in which the steps are described. The VR attraction is subdivided into a plurality of connected sections (aka rooms or booths) through which the groups or individuals are advanced, in a staggered, pipelined fashion.

In step 251, VR participants 121 are equipped with VR goggles and headsets. In step 252, the VR participants 121 are equipped with backpacks containing computerized VR engines, wherein each group is provided with an instance of a VR world or game that starts when the group is admitted into the VR attraction, so that the instances are temporally staggered between groups. In step 253, the VR participants 121 are provided with objectives for VR participants 121 to complete in each section. In step 254, a group of VR participants 121 is admitted into a first section of the VR attraction. The group is given a minimum amount of time to complete the objective. If the group has not completed the section objective in the minimum amount of time (block 255), and it is delaying the progression of newer groups from progressing forward (block 256), then in step 257, the objective or the VR representation 50 is modified to help the group advance. For example, if an individual is too frightened to cross the plank 70, then the VR representation 50 may modify the appearance of the plank 70 as spanning two buildings into an appearance of a plank spanning a small brook. Or the VR representation 50 is replaced with a true video representation of the stage section. Alternatively, an attraction operator may physically assist the participant through the section and into the next section. Flow returns to block 255.

Once the group has completed the section objective (block 255), then as long as the group has not yet completed the VR attraction (block 258), and provided the next section is vacant (block 260), then in step 261, the group is advanced to the next section. Once the group has completed the VR attraction (block 258), then in step 259, the group is led out of the VR attraction. If the group has completed the section objective (block 255) but has not yet completed the VR attraction (block 258), and is blocked from advancing to the next section by another group (block 260) then the VR attraction 50 will prolong the challenge or extend the objective within the section.

Once a group vacates the first section of the VR attraction (block 261), then in step 254 another group is admitted into the first section of the VR attraction. Each group entering the first section begins a fresh instance of the VR world—and possibly even of a different VR world if the same arrangement 10 of stage accessories supports multiple VR representations 50. In this manner, multiple groups can participate in the VR attraction at the same time by having differently clocked instances of the same (or another) VR world.

Advantageously, admitting individuals or groups into the VR attraction in a staggered fashion facilitates greater throughput. In some VR attractions, multiple players are admitted all at once. There, they play a single instance of a multiplayer game for durations extending from 15 minutes to an hour. By contrast, the inventors have created a demo that has an average duration of 5 minutes. That creates the possibility of 12 game sessions/instances—each running for groups of as many as 6 players—running per hour. If the average group size (including single-member "groups") is 3 players, then the VR attraction provides an efficient throughput of 36 players per hour. In short, the method of FIG. 24 maximizes the space by running several instances of the game, facilitating a steady throughput of people.

In another advantageous embodiment, the system is configured to differentiate between different numbers of group participants. For example, a group consisting of a single participant is presented with a VR representation of being solo or operating with artificial intelligence (AI) avatars. Also, or alternatively, the number of targets or other objectives is reduced to a number suitable for a single participant. But the greater the number of participants in the group, the greater the number of VR targets (e.g., monsters) to eliminate. And each participant is presented with a VR representation that includes a VR avatar of each other participant within the field of view. In one embodiment, the VR headsets have microphones that pick up the participant's exclamations. These exclamations are incorporated into the VR representation 50 presented to other participants in the group.

In yet another enhancement, VR representations 50 being presented to one or more participants within the VR attraction are simultaneously livestreamed to an operator console, a livestreaming website (such as Twitch® or YouTube®), or to terminals outside the VR attraction that friends and relatives can watch. The feature of livestreaming an individual participant's experience to an operator enables the operator to detect what might be slowing a group down, and aid the operator in assisting the group (block 257). Livestreaming the experiences to others provides an excellent marketing technique. In one embodiment, friends and loved ones can watch the VR representation in a booth and communicate words of encouragement—or of warning—to the VR participants. These communications are transmitted into the VR participant's headset.

In yet a further embodiment, a smart prop 60 comprising a trackable camera prop is provided. The camera prop enables participants to simulate taking a picture within the VR attraction. A motion tracking system 31 tracks the position and orientation of the camera prop. A sensor, microcontroller, and transmitter combination in the camera prop transmits a signal indicating that a camera button has been pressed. The merged reality engine 31 receives this signal and tracking information to generate an image that is consistent with what a camera would have captured in the participant-held position and orientation were the VR representation 50 a depiction of the real world. Participants are given the opportunity to purchase these simulated photographs that they took while inside the VR attraction.

A typical computer system (not shown) for use with the present invention will contain a computer, having a CPU, memory, hard disk, and various input and output devices. A display device, such as a monitor or digital display, may provide visual prompting and feedback to VR participants 121 and a stage operator during presentation of a VR representation. Speakers or a pair of headphones or earbuds provide auditory prompting and feedback to the subject.

A computer network (not shown) for use with the present invention may connect multiple computers to a server and can be made via a local area network (LAN), a wide area network (WAN), or via Ethernet connections, directly or through the Internet.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

What is claimed is:

1. A grid-based virtual reality (VR) attraction system, comprising:
   a grid aligned stage kit that corresponds to a plurality of stage plans associated with plurality of VR representations, said grid aligned stage kit comprising:
   fixed accessories;
   moveable accessories;
   a stage comprising a platform having a pattern of markings along at least two dimensions, wherein said stage is configured with accessory mounts arranged on said platform, for affixing said fixed stage accessories to said platform, and wherein said pattern identifies coordinates corresponding to a location of said accessory mounts; and
   a plurality of stage sections that are configured to be interconnected according to said pattern to form said platform, wherein said platform is configurable according to said plurality of stage plans comprising at least A×B and C×D, wherein A, B, C, and D are different from each other;
   a motion tracking system, configured to track identity, location, and/or orientation of a VR participant on said stage; and
   a VR simulation engine, coupled to said motion tracking system, configured to receive said identity, location, and/or orientation, and configured to generate said plurality of VR representations to simulate a virtual environment with virtually represented objects whose locations and orientations correspond to locations and orientations said fixed and moveable accessories that are arranged according to a corresponding stage plan.

2. The system as recited in claim 1, wherein said accessory mounts restrict a possible location of said fixed accessories on said platform.

3. The system as recited in claim 2, wherein said plurality of VR representations align representations of fixed VR objects to locations and orientations of corresponding fixed accessories without relying upon sensory information about the location of said fixed accessories.

4. The system as recited in 3, wherein representations of said fixed VR objects are more precisely aligned than representations of moveable virtual objects corresponding to said movable accessories.

5. The system as recited in claim 1, wherein said pattern of markings marks lines of a grid.

6. The system as recited in claim 5, wherein a corresponding virtual grid is displayed within one or more of said plurality of VR representations to illustrate a virtual coordinate system.

7. The system as recited in claim 6, wherein said virtual grid overlays a floor and includes grid lines that extend across and along a section of said floor.

8. The system as recited in claim 7, wherein said fixed accessories comprise a wall and a door.

9. The system as recited in claim 7, wherein said virtual grid also overlays said wall and said door.

10. The system as recited in claim 1, wherein said accessory mounts comprise holes or pegs.

11. The system as recited in claim 1, wherein each of said plurality of VR representations comprises a unique set and/or position and/or orientation of VR objects, and wherein corresponding physical objects are modular, reconfigurable, and operable to be arranged to correlate with the position and orientation of the VR objects in any selected one of the plurality of VR representations.

12. The system as recited in claim 1, wherein said fixed and moveable accessories comprise textures that provide tactile sensations to complement and augment audio and visual sensations said VR participant experiences within the VR attraction.

13. A grid-based virtual reality (VR) attraction system, comprising:
a grid aligned stage kit that corresponds to a plurality of stage plans associated with plurality of VR representations, said grid aligned stage kit comprising:
fixed accessories;
moveable accessories;
a stage comprising a platform having a pattern of markings along at least two dimensions to mark lines of a grid, wherein said stage is configured with accessory mounts arranged on said platform, for affixing said fixed stage accessories to said platform, and wherein said pattern identifies coordinates corresponding to a location of said accessory mounts; and
a plurality of stage sections that are configured to be interconnected according to said pattern to form said platform, wherein said platform is configurable according to said plurality of stage plans comprising at least A×B and C×D, wherein A, B, C, and D are different from each other;
a motion tracking system, configured to track identity, location, and/or orientation of a VR participant on said stage; and
a VR simulation engine, coupled to said motion tracking system, configured to receive said identity, location, and/or orientation, and configured to generate said plurality of VR representations to simulate a virtual environment with virtually represented objects whose locations and orientations correspond to locations and orientations said fixed and moveable accessories that are arranged according to a corresponding stage plan.

14. The system as recited in claim 13, wherein said accessory mounts restrict possible location of said fixed accessories on said platform.

15. The system as recited in claim 14, wherein said plurality of VR representations align representations of fixed VR objects to locations and orientations of corresponding fixed accessories without relying upon sensory information about the location of said fixed accessories, and wherein said representations of said fixed VR objects are more precisely aligned than representations of moveable virtual objects corresponding to said movable accessories.

16. The system as recited in claim 13, wherein a corresponding virtual grid is displayed within one or more of said plurality of VR representations to illustrate a virtual coordinate system, and wherein said virtual grid overlays a floor and includes grid lines that extend across and along a section of said floor.

17. The system as recited in claim 16, wherein said fixed accessories comprise a wall and a door, and wherein said virtual grid also overlays said wall and said door.

18. The system as recited in claim 13, wherein said accessory mounts comprise holes or pegs.

19. The system as recited in claim 13, wherein each of said plurality of VR representations comprises a unique set and/or position and/or orientation of VR objects, and wherein corresponding physical objects are modular, reconfigurable, and operable to be arranged to correlate with the position and orientation of the VR objects in any selected one of the plurality of VR representations.

20. The system as recited in claim 13, wherein said fixed and moveable accessories comprise textures that provide tactile sensations to complement and augment audio and visual sensations said VR participant experiences within the VR attraction.

* * * * *